US012135683B2

(12) United States Patent
Feng et al.

(10) Patent No.: US 12,135,683 B2
(45) Date of Patent: Nov. 5, 2024

(54) DATA ARCHIVING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Haoming Feng, Shenzhen (CN); Haitao Tu, Shenzhen (CN); Libao He, Shenzhen (CN); Qiuping Chen, Shenzhen (CN); Jiabao Chen, Shenzhen (CN); Peng Ren, Shenzhen (CN); Shuiping Zhou, Shenzhen (CN); Yong Zhao, Shenzhen (CN); He Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/339,854

(22) Filed: Jun. 22, 2023

(65) Prior Publication Data
US 2023/0334009 A1    Oct. 19, 2023

Related U.S. Application Data

(63) Continuation of application No. PCT/CN2022/100036, filed on Jun. 21, 2022.

(30) Foreign Application Priority Data

Aug. 11, 2021   (CN) .......................... 202110921637.4

(51) Int. Cl.
*G06F 16/10*    (2019.01)
*G06F 16/11*    (2019.01)
(Continued)

(52) U.S. Cl.
CPC .......... *G06F 16/113* (2019.01); *G06F 16/137* (2019.01); *G06F 16/162* (2019.01)

(58) Field of Classification Search
None
See application file for complete search history.

(56) References Cited

FOREIGN PATENT DOCUMENTS

| CN | 109298835 A | 2/2019 |
|----|-------------|--------|
| CN | 110457319 A | 11/2019 |

(Continued)

OTHER PUBLICATIONS

The World Intellectual Property Organization (WIPO) International Search Report for PCT/CN2022/100036 Sep. 21, 2022 13 Pages (including translation).

*Primary Examiner* — Belix M Ortiz Ditren
(74) *Attorney, Agent, or Firm* — Anova Law Group, PLLC

(57) ABSTRACT

A data archiving method includes: finding, in local space when an archiving task for a target block header exists, current state trees of block headers, the current state trees including a current state tree that the target block header points to and a current state tree that a first block header before the target block header points to; reconstructing new state trees according to the found current state trees, node reuse information between the current state trees, and target state data corresponding to a second block header after the target block header; and archiving the current state trees stored in the local space to a target archiving server, and deleting the current state trees in the local space after successful archiving.

20 Claims, 11 Drawing Sheets

(51) Int. Cl.
 *G06F 16/13* (2019.01)
 *G06F 16/16* (2019.01)

(56) References Cited

FOREIGN PATENT DOCUMENTS

| | | |
|---|---|---|
| CN | 110493325 A | 11/2019 |
| CN | 111475501 A | 7/2020 |
| CN | 112887421 A | 6/2021 |
| CN | 113360456 A | 9/2021 |
| WO | 2021068728 A1 | 4/2021 |

DATA ARCHIVING METHOD AND APPARATUS, DEVICE, AND STORAGE MEDIUM

CROSS-REFERENCES TO RELATED APPLICATIONS

This application is a continuation application of PCT Patent Application No. PCT/CN2022/100036, entitled "DATA ARCHIVING METHOD AND APPARATUS, DEVICE, STORAGE MEDIUM, AND COMPUTER PROGRAM PRODUCT" and filed on Jun. 21, 2022, which claims priority to Chinese Patent Application No. 202110921637.4, filed on Aug. 11, 2021, the entire contents of both of which are incorporated herein by reference.

FIELD OF THE TECHNOLOGY

The present disclosure relates to the field of Internet technologies, particularly to the field of computer technologies, and more particularly to a data archiving method and apparatus, a device, a computer-readable storage medium, and a computer program product.

BACKGROUND OF THE DISCLOSURE

With the development of a blockchain technology, a block header chain emerges. The block header chain is a chain structure that is in a blockchain node and that includes block headers connected in sequence. One block header points to one state tree in local space of the blockchain node. The state tree is a data structure for organizing and storing state data of users. The state data may be an asset (for example, a digital resource or a virtual electronic resource) of a specific user.

In a related art, the state tree that a node reuse manner is used to construct each block header points, such that some tree nodes may be reused between the state trees that two adjacent block headers point to. This reduces a quantity of tree nodes, thereby saving storage space for the blockchain node. With the node reuse manner, some tree nodes in a historical state tree may be quoted by a new state tree that a new block points to, so that state data stored in each state tree cannot be deleted at will. As running time of a blockchain network increases, state data stored in the blockchain node keeps expanded. A large amount of state data brings pressure to the storage space of the blockchain node, and there is yet no effective solution in the related art to reduction of storage pressure of the blockchain node.

SUMMARY

The embodiments of the present disclosure provide a data archiving method and apparatus, a device, a computer-readable storage medium, and a computer program product. State data stored in a blockchain node can be archived to release storage space of the blockchain node and reduce storage pressure of the blockchain node. Therefore, running performance of the blockchain node is improved, and stability of the blockchain node during running is further ensured.

An embodiment of the present disclosure provides a data archiving method, applied to a computer device. The method includes: finding, in local space when an archiving task for a target block header exists, current state trees of block headers, the current state trees including a current state tree that the target block header points to and a current state tree that a first block header before the target block header points to; reconstructing new state trees; and archiving the current state trees stored in the local space to a target archiving server, and deleting the current state trees in the local space after successful archiving. Reconstructing the new state trees includes: reconstructing, according to the found current state trees and node reuse information between the current state trees, a new state tree that the target block header points to, the new state tree that the target block header points to independently storing state data corresponding to the target block header; and reconstructing, according to the new state tree that the target block header points to and target state data corresponding to a second block header after the target block header, a new state tree that the second block header points to, where node reuse occurs between one of the new state trees corresponding to a block header and a new state tree that a block header next to the corresponding block header points to.

An embodiment of the present disclosure provides a data archiving apparatus. The apparatus includes: a search unit, configured to find, in local space when an archiving task for a target block header exists, current state trees of block headers, the current state trees including a current state tree that the target block header points to and a current state tree that each first block header before the target block header points to, a current state tree that any block header points to representing a state tree that the any block header points to when the archiving task exists; a first reconstruction unit, configured to reconstruct, according to the found current state trees and node reuse information between the current state trees, a new state tree that the target block header points to, the new state tree that the target block header points to independently storing state data corresponding to the target block header; a second reconstruction unit, configured to reconstruct, according to the new state tree that the target block header points to and target state data corresponding to a second block header after the target block header, a new state tree that the second block header points to, where node reuse occurs between any of the new state trees corresponding to a block header and a new state tree that a block header next to the corresponding block header points to; and an archiving unit, configured to archive the current state trees stored in the local space to a target archiving server as to-be-archived data, and delete each current state tree in the local space after successful archiving.

An embodiment of the present disclosure provides a computer device. The computer device includes an input device and an output device. The computer device further includes: a processor, suitable for implementing one or more instructions; and a computer-readable storage medium. The computer-readable storage medium stores one or more instructions. The one or more instructions are suitable for the processor to load and execute to perform the following operations: finding, in local space when an archiving task for a target block header exists, current state trees of block headers, the current state trees including a current state tree that the target block header points to and a current state tree that a first block header before the target block header points to; reconstructing new state trees; and archiving the current state trees stored in the local space to a target archiving server, and deleting the current state trees in the local space after successful archiving. Reconstructing the new state trees includes: reconstructing, according to the found current state trees and node reuse information between the current state trees, a new state tree that the target block header points to, the new state tree that the target block header points to independently storing state data corresponding to the target block header; and reconstructing, according to the new state tree that the target block header points to and target state data corresponding to a second block header after the target block header, a new state tree that the second block header points to, where node reuse occurs between one of the new state trees corresponding to a block header and a new state tree that a block header next to the corresponding block header points to.

An embodiment of the present disclosure provides a non-transitory computer-readable storage medium. The computer-readable storage medium stores one or more instructions. The one or more instructions are suitable for a processor to load and execute to the data archiving method as described above.

In the embodiments of the present disclosure, since the constructed new state tree that the target block header points to independently stores all the state data corresponding to the target block header, there is no reused tree node in the new state tree that the target block header and the current state tree that the first block header before the target block header points to, that is, there is no node reuse between the new state tree that the target block header points to and the current state tree that the first block header before the target block header points to. In addition, since the new state tree that each second block header after the target block header points to is constructed based on the new state tree that the target block header points to, there may be node reuse between a new state tree that any second block header points to and a new state tree that a next block header of the any second block header but not between the new state tree that the any second block header points to and the current state tree that the first block header before the target block header points to. Therefore, after the new state tree is reconstructed, since there is no node reuse in the new state tree, each current state tree stored in the local space may be archived, and each current state tree in the local space may be deleted. In this way, storage space of a blockchain node is released, and pressure brought by a large amount of historical state data in the blockchain node to the storage space is reduced, thereby effectively ensuring running stability of the blockchain node.

DESCRIPTION OF EMBODIMENTS

Figure 1A:
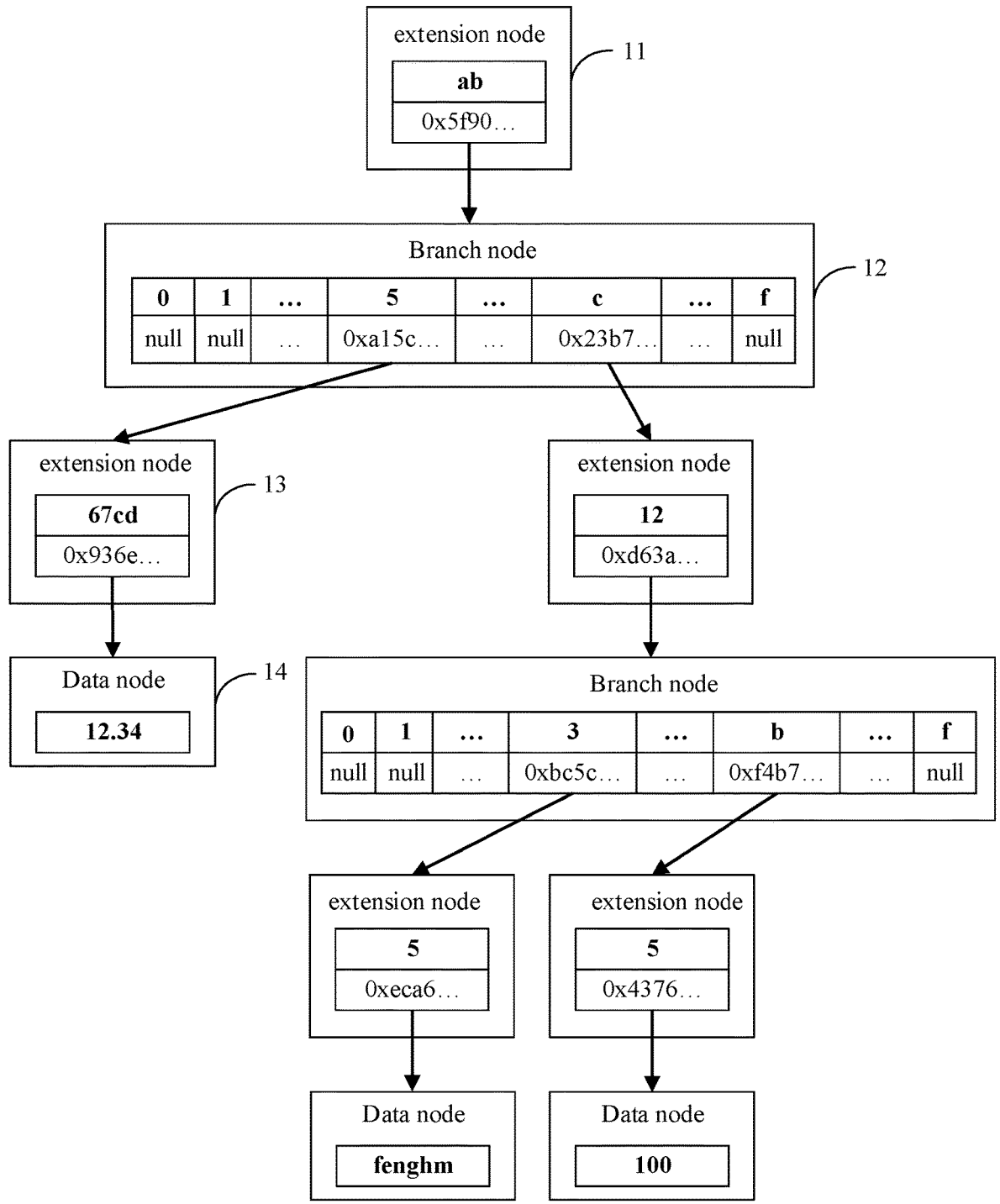
FIG. 1A is a schematic structural diagram of a state tree according to an embodiment of the present disclosure.

The technical solutions in the embodiments of the present disclosure will be described clearly and completely below in combination with the drawings in the embodiments of the present disclosure. Clearly, the described embodiments are not all but some embodiments of the present disclosure. All other embodiments obtained by a person of ordinary skill in the art based on the embodiments of the present disclosure without creative work shall fall within the protection scope of the present disclosure.

The embodiments of the present disclosure involve a blockchain network. The following briefly describes related terms and concept of the blockchain network.

A transaction involved in the embodiments of the present disclosure is also referred to as a transaction request. The transaction includes an operation that is required to be submitted to the blockchain network to be performed and a corresponding transaction result. The transaction involved in the embodiments of the present disclosure is not limited to a transaction in a commercial context. That is, transaction data (also referred to as state data) is not limited to related data such as digital currency. For example, the transaction may be a deploy transaction or an invoke transaction. The deploy transaction is used for deploying a smart contract to a node of the blockchain network, and is ready to be invoked. The invoke transaction is used for performing a query operation (that is, a read operation) or an update operation (that is, a write operation, including addition, deletion, and modification) on a state database in a ledger.

The blockchain network may be understood as a network for data sharing between nodes. A node in the blockchain may be referred to as a blockchain node. The blockchain node is a computer device for data processing in the blockchain network. The computer device may be a terminal device or a server, which is not limited. The terminal device mentioned herein may be a smartphone, a tablet computer, a notebook computer, a desktop computer, an on-board computer, a smart home, a wearable electronic device, a virtual reality (VR)/augmented reality (AR) device, or the like. The server may be an independent physical server, or a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and artificial intelligence platform.

In order to ensure information interchange in the blockchain network, there may be an information connection between blockchain nodes. Therefore, information transmission may be implemented between the blockchain nodes, thereby implementing information sharing. Peer to peer (P2P) communication may be implemented between any two blockchain nodes. Specifically, P2P communication may be performed through a wired communication link or a wireless communication link. Each blockchain node has a corresponding node identifier. In addition, each blockchain node in the blockchain network may store a node identifier of another blockchain node in the blockchain network, so as to subsequently broadcast a generated block to the another blockchain node in the blockchain network according to the node identifier of the another blockchain node. A node identifier of any blockchain node may be an Internet protocol (IP) address, or any other information that may be used for identifying the blockchain node. Taking the node identifier being the IP address as an example, a node identifier list shown in the following Table 1 may be maintained in each blockchain node.

TABLE 1

| Node name | Node identifier |
|---|---|
| Node 1 | 117.114.151.174 |
| Node 2 | 117.116.189.145 |
| . . . | . . . |
| Node N | xx.xx.xx.xx |

A block header chain may be maintained in any blockchain node (a computer device for data processing in the blockchain network, that is, a target device). The block header chain may be a chain structure including connected block headers. Each block header may point to a state tree in local space of the blockchain node. Each data node in each state tree stores state data. Unlike a complete blockchain, the block header chain does not need to retain complete state data of all accounts, and only stores a state snapshot in the block header. The state snapshot is data for pointing to a state tree. The state snapshot may represent data of a fixed length in state data stored in the target device. If any change occurs on any state data, the state snapshot may change, and accordingly, completeness of all the state data may be determined. The target device may determine a state tree that a block header points to according to a state tree that a state snapshot in the block header points to. The state data may be stored in a block body corresponding to the block header. One block header and one block body may form a block in the blockchain node. In the block body, a tree data structure may be used to store state data corresponding to all the accounts. That is, the state data may be stored in a data structure of a state tree. A leaf node in the state tree may store specific state data.

In the embodiments of the present disclosure, the state tree may be a Merkle Patricia Trie (MPT). The MPT is a tree structure for organizing data. The MPT stores state data in a form of key-value data. Tree nodes in the MPT may include three types of nodes: a data node, an extension node, and a branch node. The data node is a leaf node of the tree structure, may appear at only a bottom of the MPT, and stores specific state data. The extension node is a parent node with one child node, and includes a character string (key) of any length and a hash pointer that points to the child node. The branch node is a parent node with 1 to 16 child nodes, and has a hash value array whose capacity is 16. 16 positions in the array respectively correspond to 0 to 9 and a to f under a hexadecimal system, and each may point to one child node as a hash pointer. The hash pointer is a hash value of the child node in the MPT, and is stored in the parent node.

In order to understand the MPT provided in the embodiments of the present disclosure better, the following makes further descriptions with reference to an MPT shown in FIG. 1A. As shown in FIG. 1A, the MPT in the embodiments of the present disclosure may be any state tree in the local space of the target device. Table 2 shows state data required to be stored by using the MPT.

TABLE 2

|  | Key | Value |
|---|---|---|
| State data 1 | ab567cd | 12.34 |
| State data 2 | abc1235 | fenghm |
| State data 3 | abc12b5 | 100 |

Each piece of state data may be organized in a key-value form. Key may represent a key character string corresponding to the state data, and the key character string may be, for example, an account identifier of a specific user in a service. Value may represent a specific value corresponding to the state data. A block header may correspond to one or more pieces of state data. For example, the three pieces of state data shown in Table 2 may be state data corresponding to a specific block header. For example, a key character string corresponding to state data 1 may be "ab567cd", and a specific value corresponding to the state data 1 may be 12.34. For another example, a key character string corresponding to state data 2 may be "abc1235", and a specific value corresponding to the state data 2 may be fenghm. For another example, a key character string corresponding to state data 3 may be "abc12b5", and a specific value corresponding to the state data 3 may be 100.

It may be understood that, in the MPT, a hash pointer is a hash value of a child node in the MPT, and is stored in a parent node, so that a next-layer tree node (that is, the child node) corresponding to a current tree node (that is, the parent node) according to a hash pointer of each tree node. The key character string (key) in each piece of state data shown in Table 2 may correspond to a node path from a root node to a corresponding data node in the MPT. A specific value corresponding to the state snapshot in the above description may be a hash pointer in the root node. Based on this, a node path corresponding to each piece of state data may be determined according to a hash pointer stored in each tree node. For example, for the state data 1 in Table 2, a node path corresponding to the state data 1 may include an extension node 11, a branch node 12, an extension node 13, and a data node 14. A hash pointer in the extension node 13 is a hash value obtained by performing hash calculation on the state data 12.34 stored in the data node 14. A hash pointer of a character "5" in the branch node 12 is a hash value obtained by performing hash calculation on data stored in the extended point 13. It can be seen from the above that a hash pointer in the extension node 11 points to the branch node 12, the hash pointer of the character "5" in the branch node 12 points to the extension node 13, and the hash pointer in the extension node 13 points to the data node 14. Node paths corresponding to the state data 2 and the state data 3 respectively may be obtained in the same manner.

It may be understood that, when a state tree that each block header points to is constructed, a node reuse manner may be used. Therefore, some tree nodes may be reused between state trees that two adjacent block headers point to, and some tree nodes may also be reused between state trees that two non-adjacent block headers point to. This is not limited in the embodiments of the present disclosure. For example, after a transaction is performed for specific state data corresponding to a current block header, new state data may be obtained by updating. A new state tree that a new block header points to may be constructed according to the new state data obtained by updating, and a data node in the new state tree is used for storing the new state data after updating. A state snapshot in the new block header may point to non-updated historical state data, and a node reuse condition between the new state tree that the new block header points to and the state tree that the current block header points to may be determined according to such pointing. It can be seen from the above that a tree node reused in a state tree that the latter block header in any two adjacent block headers points to and a state tree that the former block header points to may be determined according to a node reuse condition, and the tree node that is reused is a reused tree node.

Figure 1B:
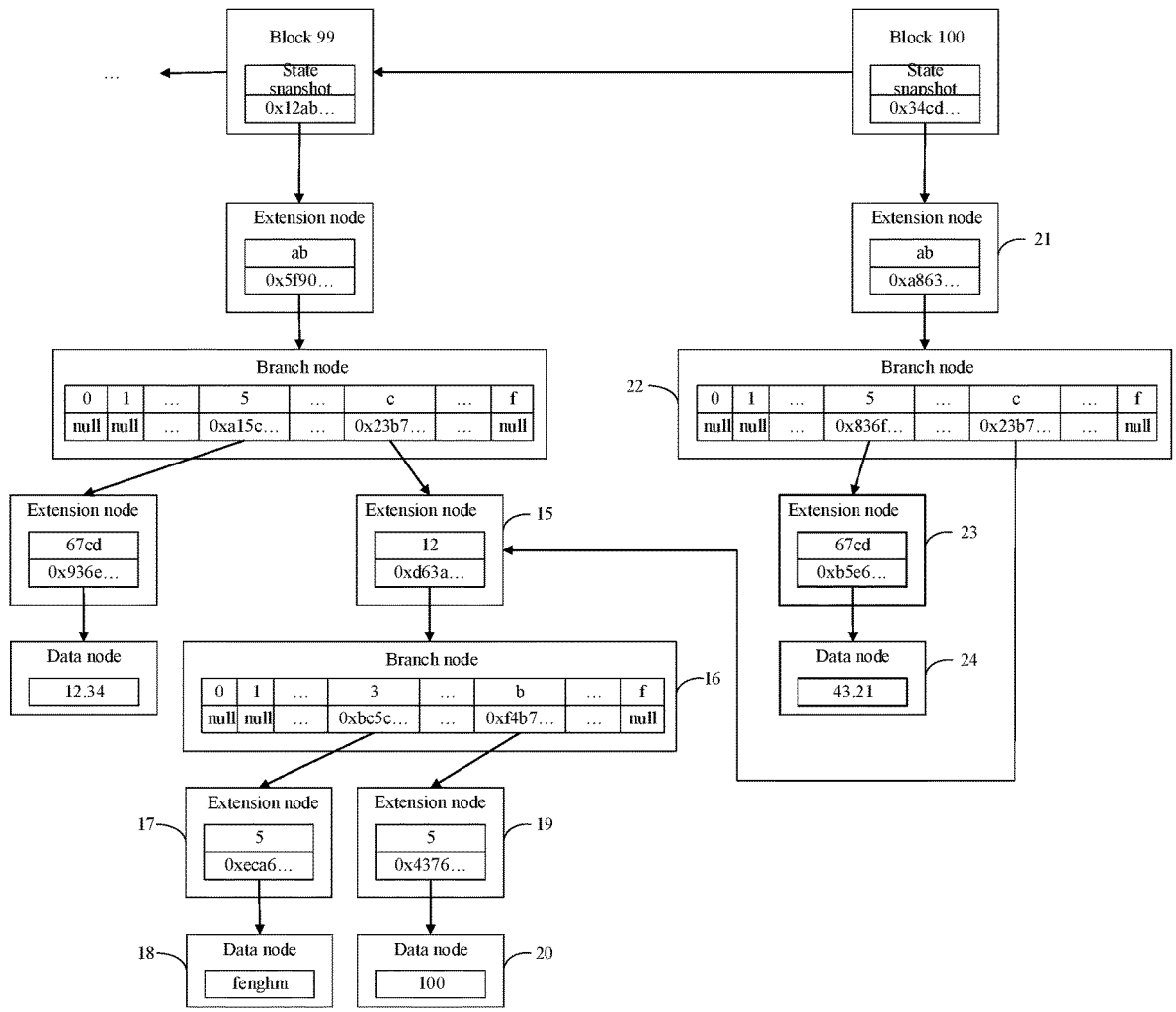
FIG. 1B is a schematic structural diagram of a node reuse condition between state trees according to an embodiment of the present disclosure.

For example, as shown in FIG. 1B, the target device generates a new block header 100 in the blockchain node. A state tree that the block header 100 includes a data node 24. State data stored in the data node 24 is 43.21. It can be seen, from a state tree that a block header 99 points to, that state data in the current block header 99 includes 12.34, fenghm, and 100. The state data 43.21 corresponding to the block header 100 is new state data obtained by updating after a transaction is performed for the state data 12.34 corresponding to the block header 99, that is, the state tree that the block header 100 may be constructed according to the state data 43.21. A state snapshot stored in the block header 100 may point to non-updated historical state data (fenghm and 100) in the block header 99. A tree node in a branch in which the corresponding non-updated historical state data in the block header 99 is may be reused in the state tree that the block header 100 points to. For example, in FIG. 1B, an extension node 15, a branch node 16, an extension node 17, a data node 18, an extension node 19, and a data node 20 in the state tree that the block header 99 points to are tree nodes reused in the state tree that the block header 100 points to, and these tree nodes that are reused tree nodes.

Figure 1C:
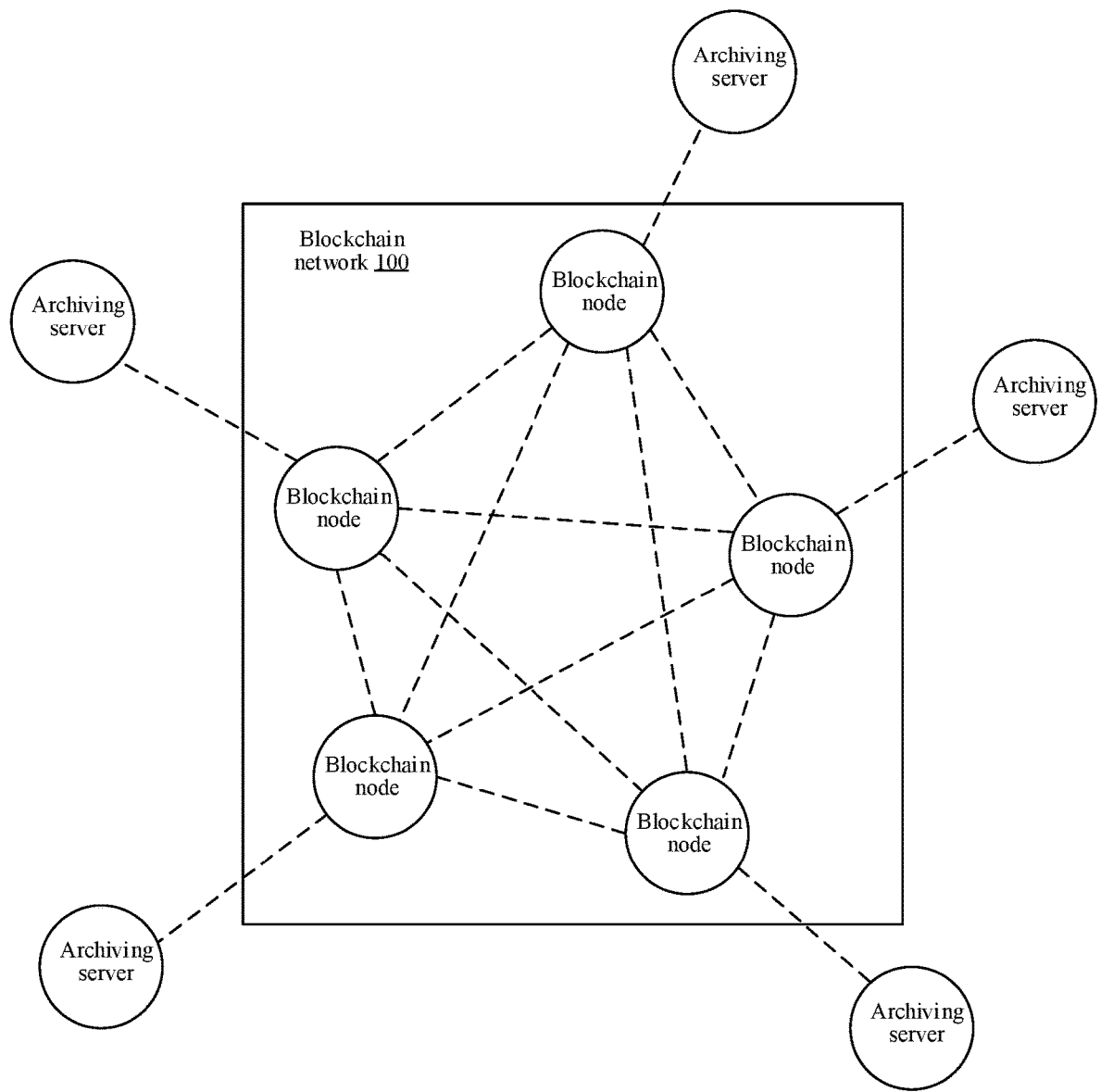
FIG. 1C is a schematic architectural diagram of a data archiving system according to an embodiment of the present disclosure.

Based on the above related description of the blockchain network, the embodiments of the present disclosure provide a state-tree-based data archiving method and a corresponding data archiving system, so as to archive stale state data stored in a blockchain node to release storage space of the blockchain node and reduce storage pressure of the blockchain node. Therefore, running performance of the blockchain node is improved, and stability of the blockchain node during running is further ensured. FIG. 1C is a schematic architectural diagram of a data archiving system according to an embodiment of the present disclosure. The data archiving system includes a blockchain network 100 and an archiving server outside the blockchain network 100. The blockchain network 100 may include a plurality of blockchain nodes. One blockchain node may communicate with one or more archiving servers. The archiving server is a server that provides, based on communication with a blockchain node, a data storage service and a data query service for the corresponding blockchain node. A quantity of blockchain nodes and a quantity of archiving servers shown in FIG. 1C are merely schematic, and any quantity of blockchain nodes and archiving servers communicating with each blockchain node may be deployed.

In the embodiments of the present disclosure, an embodiment of the present disclosure provides a data archiving method based on the data archiving system shown in FIG. 1C, so as to release storage space of a blockchain node. In a specific implementation, the data archiving method may be performed by a computer device. The computer device may be any blockchain node shown in FIG. 1C. An implementation process of the data archiving method is as follows. When there is an archiving requirement for a target block header, search is performed in local space for a current state tree that the target block header points to and a current state tree that each first block header before the target block header points to. A current state tree that any block header points to is a state tree that the any block header points to when there is the archiving requirement. Further, a new state tree that the target block header points to is reconstructed according to each found current state tree and a node reuse condition between each found current state tree. The new state tree that the target block header points to independently stores state data corresponding to the target block header. A new state tree that each second block header points to is reconstructed based on the new state tree that the target block header points to and target state data corresponding to each second block header after the target block header. The second block header is a block header after the target block header. There is node reuse between any new state tree and a new state tree that a next block header of a corresponding block header points to. That is, there is node reuse between two adjacent new state trees. There may also be node reuse between two non-adjacent new state trees. After the new state tree that the target block header points to and the new state tree that each second block header points to are reconstructed, each current state tree stored in the local space is archived to a target archiving server as to-be-archived data, and each current state tree in the local space is deleted after successful archiving.

For example, a user A, a user B, and a user C all purchase the same commodity successively: the user A purchases the commodity by a way A of "path 1-path 2-path 3-path 4", the user B purchases the commodity by a way B of "path 1-path 2-path 5-path 6", and the user C purchases the commodity by a way C of "path 7-path 8-path 3-path 4". The user A, the user B, and the user C upload their commodity purchase ways by using corresponding computer devices. In this case, according to a purchase sequence, a current state tree that a first block header points to stores state data corresponding to the way A, a current state tree that a current block header points to stores state data corresponding to the way B, and a current state tree that a second block header points to stores state data corresponding to the way C. There is node reuse (that is, path 1-path 2) between the state tree that the target block header points to and the state tree that the first block header points to, and there is node reuse (that is, path 3-path 4) between the state tree that the target block header points to and the state tree that the second block header points to. Since there is node reuse, the state data stored in each state tree cannot be deleted at will. When a purchase record that the user A, the user B, and the user C purchase the commodity does not need to be stored in the blockchain network, according to the data archiving method of this embodiment of the present disclosure, after a new state tree is reconstructed, since there is no node reuse in the new state tree, each current state tree stored in local space may be archived, and each current state tree in the local space may be deleted. In this way, storage space of a blockchain node is released, and pressure brought by a large amount of historical state data in the blockchain node to the storage space is reduced, thereby effectively ensuring running stability of the blockchain node.

For example, a user A, a user B, and a user C perform a federated learning task for a product recommendation model: the user A trains the product recommendation model by using a sample set A of "sample 1-sample 2-sample 3-sample 4", the user B trains the product recommendation model by using a sample set B of "sample 1-sample 2-sample 5-sample 6", and the user C trains the product recommendation model by using a sample set C of "sample 7-sample 8-sample 3-sample 4". The user A, the user B, and the user C upload, by using corresponding computer devices, their processes of training the product recommendation model by using the respective sample sets. In this case, according to a training sequence, a current state tree that a first block header points to stores state data corresponding to the sample set A, a current state tree that a current block header points to stores state data corresponding to the sample set B, and a current state tree that a second block header points to stores state data corresponding to the sample set C. There is node reuse (that is, sample 1-sample 2) between the state tree that the target block header points to and the state tree that the first block header points to, and there is node reuse (that is, sample 3-sample 4) between the state tree that the target block header points to and the state tree that the second block header points to. Since there is node reuse, the state data stored in each state tree cannot be deleted at will. When a training record that the user A, the user B, and the user C train the product recommendation model does not need to be stored in the blockchain network, according to the data archiving method of this embodiment of the present disclosure, after a new state tree is reconstructed, since there is no node reuse in the new state tree, each current state tree stored in local space may be archived, and each current state tree in the local space may be deleted. In this way, storage space of a blockchain node is released, and pressure brought by a large amount of historical state data in the blockchain node to the storage space is reduced, thereby effectively ensuring running stability of the blockchain node. In addition, based on a characteristic of data privacy protection of federated learning, the model is trained independently by using respective training data, so that data security of a blockchain is improved.

It can be seen from the related description about the foregoing data archiving solution, in this embodiment of the present disclosure, since the constructed new state tree that the target block header points to independently stores all the state data corresponding to the target block header, there is no reused tree node in the new state tree that the target block header and the current state tree that the first block header before the target block header points to, that is, there is no node reuse between the new state tree that the target block header points to and the current state tree that the first block header before the target block header points to. In addition, since the new state tree that each second block header after the target block header points to is constructed based on the new state tree that the target block header points to, similarly, there may be node reuse between a new state tree that any second block header points to and a new state tree that a next block header of the any second block header but not between the new state tree that the any second block header points to and the current state tree that the first block header before the target block header points to. Therefore, after each current state tree stored in the local space is successfully archived to the corresponding archiving server as the to-be-archived data, each current state tree in the local space may be subsequently deleted. In this way, storage space of a blockchain node is released, and pressure brought by a large amount of historical state data in the blockchain node to the storage space is reduced, thereby effectively ensuring running stability of the blockchain node.

Figure 2:
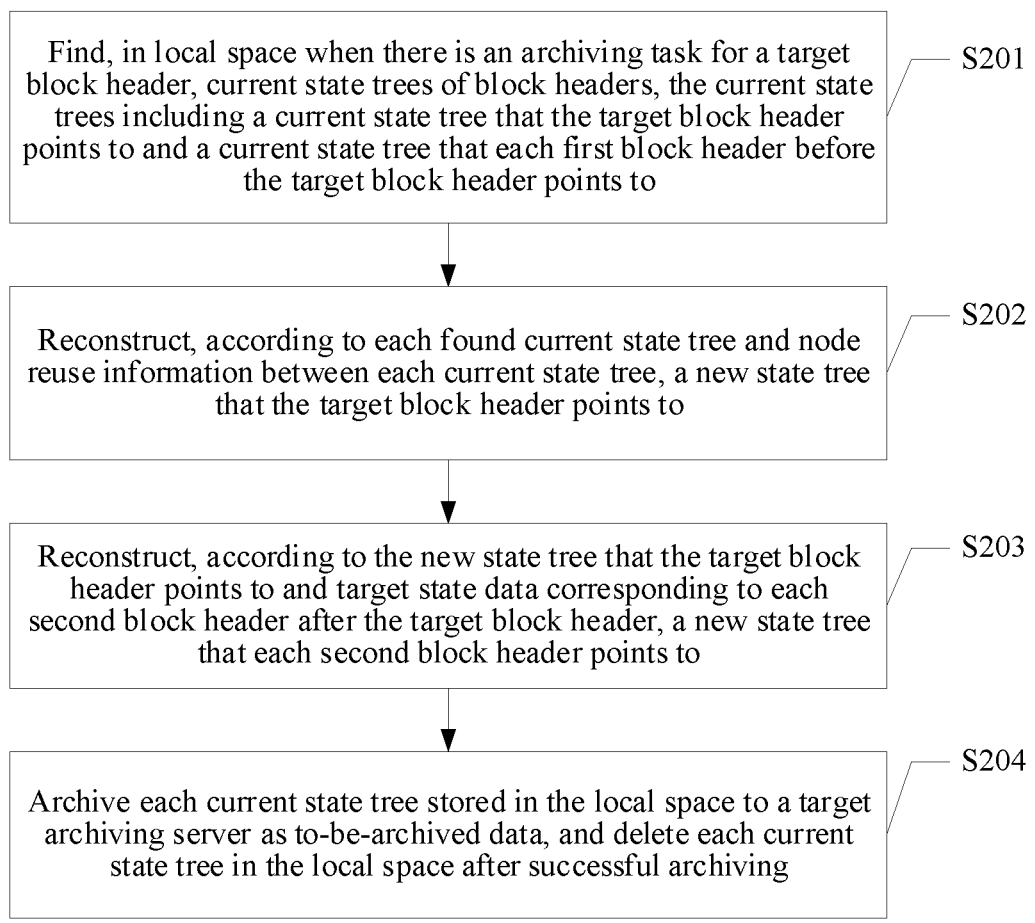
FIG. 2 is a schematic flowchart of a data archiving method according to an embodiment of the present disclosure.

As shown above, an embodiment of the present disclosure provides a data archiving method. The data archiving method may be performed by the target device mentioned above (a computer device for data archiving, that is, a data archiving device). Referring to FIG. 2, the data archiving method may include the following steps S201 to S204:

S201: Find, in local space when an archiving task for a target block header exists, current state trees of block headers, the current state trees including a current state tree that the target block header points to and a current state tree that each first block header before the target block header points to.

A current state tree that any block header points to represents a state tree that the any block header points to when there is the archiving task (also referred to as an archiving requirement).

Figure 3:
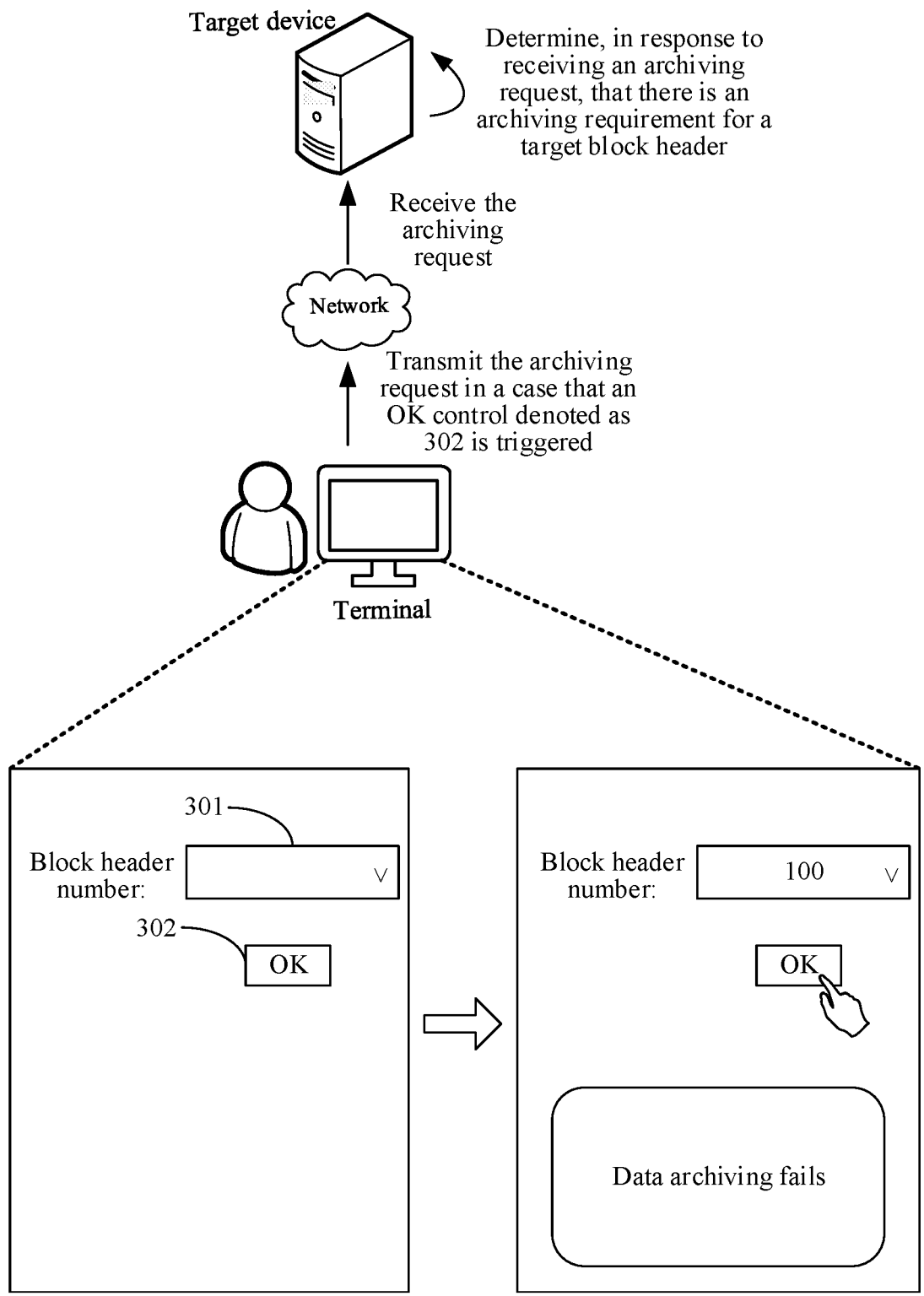
FIG. 3 is a schematic structural diagram of determining that there is an archiving requirement according to an embodiment of the present disclosure.

For example, it is determined that there is currently the archiving requirement for the target block header when the target device (a blockchain node for data processing in a blockchain network) receives an archiving request for the target block header. For example, an archiving manager may send the archiving request for the target block header to the target device, such that the target device receives the archiving request. After receiving the archiving request, the target device determines that there is the archiving task (also referred to as the archiving requirement) for the target block header. In an implementation, when the archiving manager needs to perform data archiving on state data stored in the local space of the target device, the archiving manager may perform a related operation on a user operation interface of a terminal to send the archiving request for the target block header to the target device. For example, referring to FIG. 3, a user operation interface is displayed on a screen of the terminal used by the archiving manager. The user operation interface may include at least a block header setting region denoted as 301 and an OK control denoted as 302. If the archiving manager is intended to archive state data stored in a current state tree that a 100th block header points to, the archiving manager may enter related information (for example, a block header number) of the 100th block header in the block header setting region 301, and then perform a trigger operation (for example, a tap operation or a press operation) on the OK control 302, thereby triggering the terminal used by the archiving manager to determine a target block header according to a block header is indicated by the related information obtained from the block header setting region 301 and send an archiving request for the target block header to the target device.

For example, the archiving task (also referred to as the archiving requirement) may alternatively be generated by triggering an archiving timing task. For example, the archiving timing task may be set, which indicates a trigger condition for archiving state data in the local space of the target device. For example, the trigger condition may be that current time reaches preset archiving time or that remaining storage space in the local space of the target device reaches preset remaining storage space.

For example, when there is the archiving requirement for the target block header, requirement check may be performed on the archiving requirement for the target block header, to check whether the archiving requirement is implementable. If a check result is that the archiving requirement is implementable, a subsequent step may be performed; or if a check result is that the archiving requirement is unimplementable, a subsequent step may not be performed. Requirement check may be performed on the archiving requirement for the target block header according to a block height of the target block header, which may be implemented by the following process. A current block header is determined in a block header chain, and a latest block header is determined in the block header chain. The current block header may be a block header that points to a state tree in the local space and that has a smallest block height. The latest block header may be a block header that points to a state tree in the local space and has a largest block height. After the current block header and the latest block header are determined in the block header chain, requirement check is performed on the archiving requirement according to the block height of the target block header and block heights respectively corresponding to the current block header and the latest block header. For example, if the block height of the target block header is greater than that of the current block header and less than that of the latest block header, it indicates that there is currently to-be-archived data and that the archiving requirement for the target block header is implementable, that is, the operation of searching for, in a local space, a current state tree that the target block header points to and a current state tree that each first block header before the target block header points to may be performed. If the block height of the target block header is less than that of the current block header or greater than that of the latest block header, it indicates that there is currently no to-be-archived data and that the archiving requirement for the target block header is unimplementable, and the subsequent step does not need to be performed. In this case, the target device may further return error information to an archiving management device, the error information indicating that the current archiving requirement is unimplementable, such that the archiving manager corresponding to the archiving management device adjusts the archiving requirement. For example, the error information may be displayed in a second region on the user operation interface in FIG. 3. For example, "Data archiving fails" displayed on the user operation interface in FIG. 3 may be error information.

For ease of subsequent description, block headers may be arranged sequentially in order of block height from low to high. Therefore, the current block header and each block header between the current block header and the target block header may be referred to as first block headers, and the latest block header and each block header between the latest block header and the target block header may be referred to as second block headers.

For example, the target device may search for, in the local space when there is the archiving requirement for the target block header, the current state tree that the target block header points to and the current state tree that each first block header before the target block header points to. When searching for the current state tree, the target device may search according to a state snapshot stored in the target block header. Each state snapshot may point to a state tree. Similarly, the target device may also search for, according to a state snapshot stored in each first block header, the current state tree that each first block header before the target block header points to.

S202: Reconstruct, according to the found current state trees and node reuse information between the current state trees, a new state tree that the target block header points to.

The new state tree that the target block header points to independently stores state data corresponding to the target block header. For example, there is no node reuse between the new state tree that the target block header points to and the current state tree that each first block header points to. In some embodiments, some or all state data corresponding to the target block header are independently stored in the new state tree that the target block header points to.

In some embodiments, the target device may determine at least one reused tree node from each current state tree according to the node reuse information (also referred to as a node reuse condition) between each found current state tree. The reused tree node represents a tree node reused in the current state tree that the target block header points to and a current state tree that any first block header points to. After the reused tree node is determined, the new state tree that the target block header points to may be determined according to the reused tree node and each tree node of the current state tree that the target block header points to. For example, the target device may copy the at least one reused tree node, copy each tree node in the current state tree that the target block header points to, and reconstruct, according to tree nodes obtained by copying, the new state tree that the target block header points to. The tree nodes obtained by copying may include each reused tree node obtained by copying, and each tree node, obtained by copying, in the current state tree that the target block header points to.

Since the constructed new state tree that the target block header points to independently stores all the state data corresponding to the target block header, there is no reused tree node in the new state tree that the target block header and the current state tree that the first block header before the target block header points to, that is, there is no node reuse between the new state tree that the target block header points to and the current state tree that the first block header before the target block header points to. Since there is no node reuse in the new state tree, each current state tree stored in the local space may be archived, and each current state tree in the local space may be deleted. In this way, storage space of the blockchain node is released, and pressure brought by a large amount of historical state data in the blockchain node to the storage space is reduced.

S203: Reconstruct, according to the new state tree that the target block header points to and target state data corresponding to a second block header after the target block header, a new state tree that the second block header points to.

There is node reuse between a target new state tree corresponding to a block header and a new state tree that a block header next to the corresponding block header points to. Here, the target new state tree may refer to any new state tree reconstructed in S203 and S204.

It is assumed that a quantity of second block headers is M, M being a positive integer. Target state data corresponding to an $m^{th}$ second block header represents state data, different from each piece of state data corresponding to a previous block header of the $m^{th}$ second block header, in a plurality of pieces of state data corresponding to the $m^{th}$ second block header, that is, new state data generated by state data updating based on the plurality of pieces of state data corresponding to the $m^{th}$ second block header. For example, the state data corresponding to the previous block header of the $m^{th}$ second block header includes state data A, state data B, and state data C, and the state data corresponding to the $m^{th}$ second block header includes state data D, the state data B, and the state data C. It can be seen from the foregoing data that the target state data corresponding to the $m^{th}$ second block header is the state data D. $m \in [1, M]$.

In some embodiments, for any second block header in each second block header, for example, taking the any second block header being the $m^{th}$ second block header as an example for description, an implementation process of reconstructing a new state tree that the $m^{th}$ second block header points to may be as follows. The target device generates a new leaf node based on the target state data corresponding to the $m^{th}$ second block header, the new leaf node being a new data node. Then, the target state data corresponding to the $m^{th}$ second block header is stored to the new leaf node. The new state tree that the $m^{th}$ second block header points to is reconstructed according to a new leaf node storing the target state data and a new state tree that the previous block header of the $m^{th}$ second block header points to.

The new state tree that each second block header points to may be reconstructed by the foregoing method. There may be node reuse between a new state tree that any second block header points to and a new state tree that a next second block header of the corresponding block header points to. For example, at least one leaf node (data node) is reused in the new state tree that the $m^{th}$ second block header points to and the new state tree that the previous block header points to. In an implementation, the previous block header is the target block header when m is 1.

Since the new state tree that each second block header after the target block header points to is constructed based on the new state tree that the target block header points to, there may be node reuse between a new state tree that any second block header points to and a new state tree that a next block header of the any second block header points to but not between the new state tree that the any second block header points to and the current state tree that the first block header before the target block header points to. Since there is no node reuse in the new state tree, each current state tree stored in the local space may be archived, and each current state tree in the local space may be deleted. In this way, the storage space of the blockchain node is released, and the pressure brought by the large amount of historical state data in the blockchain node to the storage space is reduced.

S204: Archive each current state tree stored in the local space to a target archiving server as to-be-archived data, and delete each current state tree in the local space after successful archiving.

For example, after the new state tree that the target block header points to and the new state tree that each second block header points to are reconstructed through the foregoing steps, the to-be-archived data may be archived to the target archiving server. The to-be-archived data may be each current state tree stored in the local space. After successfully archived to the target archiving server, each current state tree in the local space may be deleted. After the current state tree in the local space is deleted, current storage space of the local space may be enlarged, thereby reducing storage pressure of the local space.

In some embodiments, when the to-be-archived data is archived to the target archiving server, a starting block number and an ending block number for data archiving processing also need to be archived to the target archiving server, such that the target device may subsequently perform data query according to the starting block number and the ending block number when receiving a data query request for a specified block header. When the to-be-archived data is archived to the target archiving server, a block number of a first block number with a smallest block height in each first block header is determined as the starting block number, and a block number of a first block header with a largest block height in each first block header is determined as the ending block number. Then, after the starting block number and the ending block number are determined, each current state tree stored in the local space is determined as the to-be-archived data, and an archiving request is generated according to the to-be-archived data, the starting block number, and the ending block number. Further, the archiving request is transmitted to the target archiving server to request the target archiving server to perform a hash operation on the to-be-archived data according to the archiving request to obtain a data hash value and return the data hash value after storing the data hash value, the to-be-archived data, the starting block number, and the ending block number.

The hash operation may be a digest hash operation or another hash operation, which is not limited in this embodiment of the present disclosure. After data archiving is performed based on the starting block number and the ending block number, data query may subsequently be performed quickly based on the starting block number and the ending block number. This improves data query efficiency.

In the foregoing process of archiving the to-be-archived data to the target archiving server, the target device may determine that the to-be-archived data has been successfully archived to the target archiving server if receiving the data hash value transmitted by the target archiving server. After determining that the to-be-archived data is successfully archived, the target device may record the data hash value, an archiving timestamp, the starting block number, the ending block number, and a server identifier of the target archiving server to an archiving record in the local space, so as to subsequently perform data query according to the archiving record in the local space. The archiving timestamp may be time when the to-be-archived data is archived to the target archiving server. The server identifier of the target archiving server may be an IP address corresponding to the target archiving server or other information that may be used for identifying the target archiving server, which is not limited in this embodiment of the present disclosure. In the following description, an example in which the server identifier is an IP address is used as an example for related description.

In some embodiments, after receiving the to-be-archived data transmitted by the target device and performing the hash operation on the to-be-archived data to obtain the data hash value, the target archiving server may further record the data hash value, the to-be-archived data, the starting block number, the ending block number, and the archiving timestamp in an archiving record in the target archiving server, so as to perform data query according to the archiving record in the target archiving server.

For example, if the to-be-archived data is recorded in a form of a list, the archiving record may be an archiving record list. That is, information such as the to-be-archived data may be recorded in an archiving record list in the local space, and correspondingly, information such as the to-be-archived data may also be recorded in the archiving record in the target archiving server. For example, Table 3 shows the archiving record list in the local space.

TABLE 3

| Archiving timestamp | Data hash value | Starting block number | Ending block number | Server identifier |
|---|---|---|---|---|
| T1 | A | A1 | A2 | IP1 |
| T2 | B | B1 | B2 | IP2 |
| T3 | C | C1 | C2 | IP3 |
| ... | ... | ... | ... | ... |

Each row in Table 3 is archiving related information in one data archiving process. The archiving record list may record archiving related information in each data archiving process. The archiving related information in each data archiving process may be recorded at the end of the current archiving record list, so as to ensure orderliness of content recorded in the archiving record list and make it convenient for a user to subsequently view the archiving record list. The archiving related information in the archiving record list in the local space may include the archiving timestamp, the data hash value, the starting block number, the ending block number, and the server identifier. As shown in Table 3, archiving related information recorded in the archiving record list after a specific data archiving process includes an archiving timestamp T1, a data hash value A, a starting block number A1, an ending block number A2, and a server identifier IP1.

For another example, Table 4 shows an archiving record list in the target archiving server.

TABLE 4

| Archiving timestamp | Data hash value | Starting block number | Ending block number | To-be-archived data |
|---|---|---|---|---|
| T4 | D | D1 | D2 | To-be-archived data D |
| T2 | B | B1 | B2 | To-be-archived data B |
| T5 | E | E1 | E2 | To-be-archived data E |
| ... | ... | ... | ... | ... |

Each row in Table 4 is archiving related information in one data archiving process. The archiving record list in the target archiving server may further record archiving related information in each data archiving process. The archiving related information in each data archiving process may be recorded at the end of the current archiving record list, so as to ensure orderliness of content recorded in the archiving record list and make it convenient for a user to subsequently view the archiving record list. The archiving related information in the archiving record list in the target archiving server may include the archiving timestamp, the data hash value, the starting block number, the ending block number, and the to-be-archived data As shown in Table 4, archiving related information recorded in the archiving record list after a specific data archiving process includes an archiving timestamp T1, a data hash value A, a starting block number A1, an ending block number A2, and to-be-archived data A.

The archiving record list in the target archiving server is synchronized with the archiving record list in the local space. That is, for a record in the archiving record list in the local space, there is a corresponding record in the archiving record list in the target archiving server. For example, the target device may communicate with a plurality of archiving servers, that is, to-be-archived data that is to be archived by the target device each time in the local space may be archived to different archiving servers. An archiving server to which to-be-archived data recorded in a specific time is specifically archived may be determined according to the server identifier in Table 3. For example, the information recorded in the third row in Table 3 is archiving related information in a specific data archiving process. If a server identifier of the target archiving server corresponding to the archiving record list shown in Table 4 is IP2, it can be seen from Table 3 that to-be-archived data obtained by the specific data archiving process is archived to the target archiving server whose server identifier is IP2. In this case, the archiving related information in the specific data archiving process may be found from the archiving record list in the target archiving server whose server identifier is IP2. For example, the information recorded in the third row in Table 4 is the archiving related information in the specific data archiving process.

In some embodiments, each time when performing data archiving, the target device may record information about to-be-archived data in an archiving record in the local space and an archiving record in the target archiving server. Then, the target device may subsequently perform query according to the information recorded in the two archiving records when receiving, for example, a data query request. For example, the target device may perform data query in response to a data query request for a specified block header. After responding to the data query request, the target device may read the ending block number from the archiving record in the local space, so as to determine, according to the ending block number, whether to query data of the specified block header in the local space or query data of the specified block header in the target archiving server. For example, if a block number of the specified block header is less than or equal to the ending block number, query may be performed in the target archiving server; or if a block number of the specified block header is greater than the ending block number, query may be performed in the local space.

For example, if the block number of the specified block header is less than or equal to the ending block number, a specified data query request may be generated according to the data hash value in the archiving record in the local space and the block number of the specified block header. After the specified data query request is generated, the specified data query request may be transmitted to the target archiving server, such that the target archiving server determines and returns state data corresponding to the specified block header according to the data hash value carried in the specified data query request, the data hash value indicating the current state tree in the to-be-archived data and the block number of the specified block header. The target device may receive the state data that is returned by the target archiving server and that corresponds to the specified block header, and outputs the received state data.

If the specified block number of the specified block header is greater than the ending block number, a new state tree that the specified block header points to is determined in the local space, and a new state tree that each block header before the specified block header points to is determined. For example, state data corresponding to the specified block header is obtained based on each determined new state tree, and the obtained state data is output.

In some embodiments, the target device may communicate with one or more archiving servers. When the target device communicates with one archiving server, the target archiving server is the archiving server communicating with the target device. When the target device communicates with a plurality of archiving servers, the target archiving server may be determined from the plurality of archiving servers, such that the to-be-archived data is archived by using the target archiving server. An archiving server may be randomly selected from the plurality of archiving servers as the target archiving server. Alternatively, an archiving server may be selected from the plurality of archiving servers as the target archiving server according to a target selection rule. For example, the target selection rule may be selecting a best archiving server from the plurality of archiving servers as the target archiving server. An evaluation criterion for the best may be determining according to an archiving priority of each archiving server, and the best archiving server may be an archiving server with a highest archiving priority. That is, the archiving server with the highest archiving priority may be determined as the target archiving server. The archiving priority of each archiving server may be determined according to an archiving performance parameter of each archiving server.

The target archiving server is determined according to the archiving performance parameter of each archiving server. The determined target archiving server has high archiving performance, and can perform data archiving quickly. Therefore, the pressure brought by the large amount of historical state data in the blockchain node to the storage space is reduced as soon as possible.

For example, the target device may obtain the archiving performance parameter of each archiving server, the archiving performance parameter including at least one of a remaining data storage capacity, a transmission bandwidth, and a security coefficient. After the archiving performance parameter of each archiving server is obtained, the archiving priority of each archiving server is determined according to the archiving performance parameter, and the archiving server corresponding to the highest archiving priority is determined as the target archiving server.

An example in which the archiving performance parameter is any one of the remaining data storage capacity, the transmission bandwidth, and the security coefficient is used for description.

If the archiving performance parameter is the remaining data storage capacity, a remaining data storage capacity of each archiving server may be obtained. An archiving server corresponding to a lower remaining data storage capacity has a lower archiving priority, and correspondingly, an archiving server corresponding to a higher remaining data storage capacity has a higher archiving priority. That is, an archiving server corresponding to a highest remaining data storage capacity has a highest archiving priority, so that the archiving server corresponding to the highest remaining data storage capacity may be determined as the target archiving server. In an implementation, a specific implementation of obtaining the remaining data storage capacity of each archiving server may be as follows. The target device transmits a remaining data capacity obtaining request to each archiving server to request each archiving server to return its own remaining data storage capacity. After receiving the remaining data capacity obtaining request, each archiving server determines its own remaining data storage capacity, and returns the remaining data storage capacity to the target device. The target device receives the remaining data storage capacity returned by each archiving server.

If the archiving performance parameter is the transmission bandwidth, a transmission bandwidth of each archiving server may be obtained. An archiving server corresponding to a smaller transmission bandwidth has a lower archiving priority, and correspondingly, an archiving server corresponding to a larger transmission bandwidth has a higher archiving priority. That is, an archiving server corresponding to a largest transmission bandwidth has a highest archiving priority, so that the archiving server corresponding to the largest transmission bandwidth may be determined as the target archiving server. In an implementation, a specific implementation process of obtaining the transmission bandwidth in the archiving performance parameter of each archiving server may be as follows. The target device transmits a bandwidth detection request to each archiving server, the bandwidth detection request being used for instructing each archiving server to return target data of a specified data volume. After each archiving server returns the target data of the specified data volume, the target device receives the target data returned by each archiving server. The target device determines the transmission bandwidth of each archiving server based on time consumed by each archiving server to return the target data.

If the archiving performance parameter is the security coefficient, a security coefficient of each archiving server may be obtained. An archiving server corresponding to a lower security coefficient has a lower archiving priority, and correspondingly, an archiving server corresponding to a higher security coefficient has a higher archiving priority. That is, an archiving server corresponding to a highest security coefficient has a highest archiving priority, so that the archiving server corresponding to the highest security coefficient may be determined as the target archiving server. In an implementation, a specific implementation process of obtaining the security coefficient in the archiving performance parameter of each archiving server may be as follows. The target device transmits a security coefficient obtaining request to each archiving server to request each archiving server to return its own security coefficient. After receiving the security coefficient obtaining request, each archiving server determines its own security coefficient, and returns the security coefficient to the target device. The target device receives the security coefficient returned by each archiving server. The security coefficient may be used for measuring a probability that stolen of the archiving server is stolen. A specific implementation in which the archiving server determines its own security coefficient may be that: the archiving server collects statistics on a quantity of times that data is archived and a quantity of times that archived data is successfully stolen, and determines a ratio between the quantity of times that archived data is successfully stolen and the quantity of times that data is archived as the security coefficient. Alternatively, the archiving server collects statistics on a data volume of data that is archived and a data volume of archived data that is successfully stolen, and determines a ratio between the data volume of the archived data that is successfully stolen and the data volume of the data that is archived as the security coefficient. Alternatively, the security coefficient of the archiving server may be determined in another manner. This is not limited in this embodiment of the present disclosure.

For example, a correspondence between an archiving performance parameter and an archiving priority may be preset. In this case, after obtaining the archiving performance parameter, the target device may determine the archiving priority corresponding to the archiving performance parameter according to the obtained archiving performance parameter and the preset correspondence. The correspondence may be that an archiving performance parameter is in positive correlation with an archiving priority, or may be a specific numerical correspondence between an archiving performance parameter and an archiving priority. This is not limited in this embodiment of the present disclosure. For example, when the archiving performance parameter includes one of the remaining data storage capacity, the transmission bandwidth, and the security coefficient, the correspondence may be that an archiving performance parameter is in positive correlation with an archiving priority. For example, as described above, an archiving server corresponding to a lower remaining data storage capacity has a lower archiving priority. For another example, as described above, an archiving server corresponding to a smaller transmission bandwidth has a lower archiving priority. For another example, as described above, an archiving server corresponding to a lower security coefficient has a lower archiving priority. It is assumed that the archiving performance parameter is the remaining data storage capacity, a quantity of archiving servers communicating with the target device is 3, and a magnitude relationship between remaining data storage capacities respectively corresponding to the three archiving servers is P1 (an archiving server 1)>P2 (an archiving server 2)>P3 (an archiving server 3). It can be seen from the magnitude relationship between the remaining data storage capacities that a relationship between archiving priorities of the three archiving servers is the archiving server 1>the archiving server 2>the archiving server 3, that is, the archiving server 1 has a highest archiving priority.

An example in which the archiving performance parameter is the remaining data storage capacity, the transmission bandwidth, and the security coefficient is used for description. For any archiving server in the plurality of archiving servers, the target device may obtain a remaining data storage capacity, a transmission bandwidth, and a security coefficient of the archiving server. A manner in which the remaining data storage capacity, the transmission bandwidth, and the security coefficient are obtained may refer to the above description, and will not be limited in this embodiment of the present disclosure. For example, the target device may determine a first priority according to the remaining data storage capacity of the archiving server. A higher remaining data storage capacity corresponds to a higher first priority. Similarly, a second priority may be determined according to the transmission bandwidth of the archiving server, and a third priority may be determined according to the security coefficient of the archiving server. After a first priority, a second priority, and a second priority that correspond to each archiving server are obtained, the archiving priority of each archiving server may be determined according to the three priorities. For example, for an archiving server, a sum of the first priority, the second priority, and the third priority may be determined as the archiving priority of the archiving server. For another example, weighting processing may be performed on each priority and a corresponding parameter weight, and then a sum of each weighting processing result may be determined as the archiving priority of the archiving server. The parameter weight corresponding to each priority may be preset. The corresponding parameter weight may be set according to an actual service requirement. The parameter weight corresponding to an archiving performance parameter emphasized by the service requirement may be set to be great. The sum of each parameter weight is 1. In this manner, the archiving priority of each archiving server may be determined. After the archiving priority of each archiving server is determined, the archiving server corresponding to the highest archiving priority may be determined as the target archiving server.

In this embodiment of the present disclosure, a level of a priority (for example, the above-described archiving priority, first priority, second priority, and third priority) may be understood as that the priority is higher if having a larger numerical value. The priority may alternatively be another numerical value as long as the priority and the level of the priority may be reflected.

It can be seen from the above description that the target device may preset the correspondence between an archiving performance parameter and an archiving priority. Similarly, when the archiving performance parameter includes multiple of the remaining data storage capacity, the transmission bandwidth, and the security coefficients, a correspondence between each archiving performance parameter and a priority thereof may be set. For example, a correspondence between a remaining data storage capacity and a first priority, a correspondence between a transmission bandwidth and a second priority, and a correspondence between a security coefficient and a third priority may be set. For ease of subsequent determining of the archiving priority according to the first priority, the second priority, and the third priority, the correspondence herein may be a numerical correspondence between an archiving performance parameter and an archiving priority. For example, Table 5 shows the correspondence between a remaining data storage capacity and a first priority.

TABLE 5

| Remaining data storage capacity | First priority |
|---|---|
| 0 to K1 | 1 |
| K1 to K2 | 2 |
| K2 to K3 | 3 |
| ... | ... |

For another example, Table 6 shows the correspondence between a transmission bandwidth and a second priority.

TABLE 6

| Transmission bandwidth | Second priority |
|---|---|
| 0 to Q1 | 1 |
| Q1 to Q2 | 2 |
| Q2 to Q3 | 3 |
| ... | ... |

For another example, Table 7 shows the correspondence between a security coefficient and a third priority.

TABLE 7

| Security coefficient | Third priority |
|---|---|
| R1 | 1 |
| R2 | 2 |
| R3 | 3 |
| ... | ... |

For example, it is assumed that a quantity of archiving servers communicating with the target device is 3 (an archiving server 1, an archiving server 2, and an archiving server 3), and the archiving performance parameter includes the remaining data storage capacity, the transmission bandwidth, and the security coefficient. After obtaining an archiving performance parameter of each archiving server, the target device may determine a first priority according to a remaining data storage capacity in the archiving performance parameter and the correspondence between a remaining data storage capacity and a first priority shown in Table 5. Similarly, a second priority may be determined according to a transmission bandwidth and a correspondence shown in Table 6, and a third priority may be determined according to a security coefficient and the correspondence shown in Table 7. If a first priority of the archiving server 1 is 3, a second priority is 2, and a third priority is 5, an archiving priority of the archiving server 1 may be 10 (3+2+5). If a first priority of the archiving server 2 is 5, a second priority is 1, and a third priority is 3, an archiving priority of the archiving server 2 may be 9 (5+1+3). If a first priority of the archiving server 3 is 1, a second priority is 4, and a third priority is 2, an archiving priority of the archiving server 3 may be 7 (1+4+2). It can be seen from the above that the archiving priority of the archiving server 1 is highest, so that the archiving server 1 may be determined as the target archiving server.

In this embodiment of the present disclosure, the target device may search for, in the local space when there is the archiving requirement, the current state tree that the target block header points to and the current state tree that each first block header before the target block header points to. Further, the new state tree that the target block header points to may be reconstructed according to each found current state tree and the node reuse condition between each found current state tree, the new state tree that the target block header points to independently storing all the state data corresponding to the target block header. The new state tree that each second block header points to is reconstructed based on the new state tree that the target block header points to and the target state data corresponding to each second block header after the target block header. After the new state tree that the target block header points to and the new state tree that each second block header points to are reconstructed, each current state tree stored in the local space is archived to the target archiving server as the to-be-archived data, and each current state tree in the local space is deleted after successful archiving. According to the foregoing implementation method, the new state tree that the target block header points to and the new state tree that each second block header after the target block header points to may be constructed. Since the new state tree that the target block header points to independently stores all the state data corresponding to the target block header, there is no reused tree node in the new state tree that the target block header and the current state tree that the first block header before the target block header points to, that is, there is no node reuse between the new state tree that the target block header points to and the current state tree that the first block header before the target block header points to. In addition, since the new state tree that each second block header after the target block header points to is constructed based on the new state tree that the target block header points to, there may be node reuse between a new state tree that any second block header points to and a new state tree that a next block header of the any second block header but not between the new state tree that the any second block header points to and the current state tree that the first block header before the target block header points to. Therefore, after the new state tree is reconstructed, since there is no node reuse in the new state tree, each current state tree stored in the local space may be archived, and each current state tree in the local space may be deleted. In this way, the storage space of the blockchain node is released, and the pressure brought by the large amount of historical state data in the blockchain node to the storage space is reduced, thereby effectively ensuring the running stability of the blockchain node.

Figure 4:
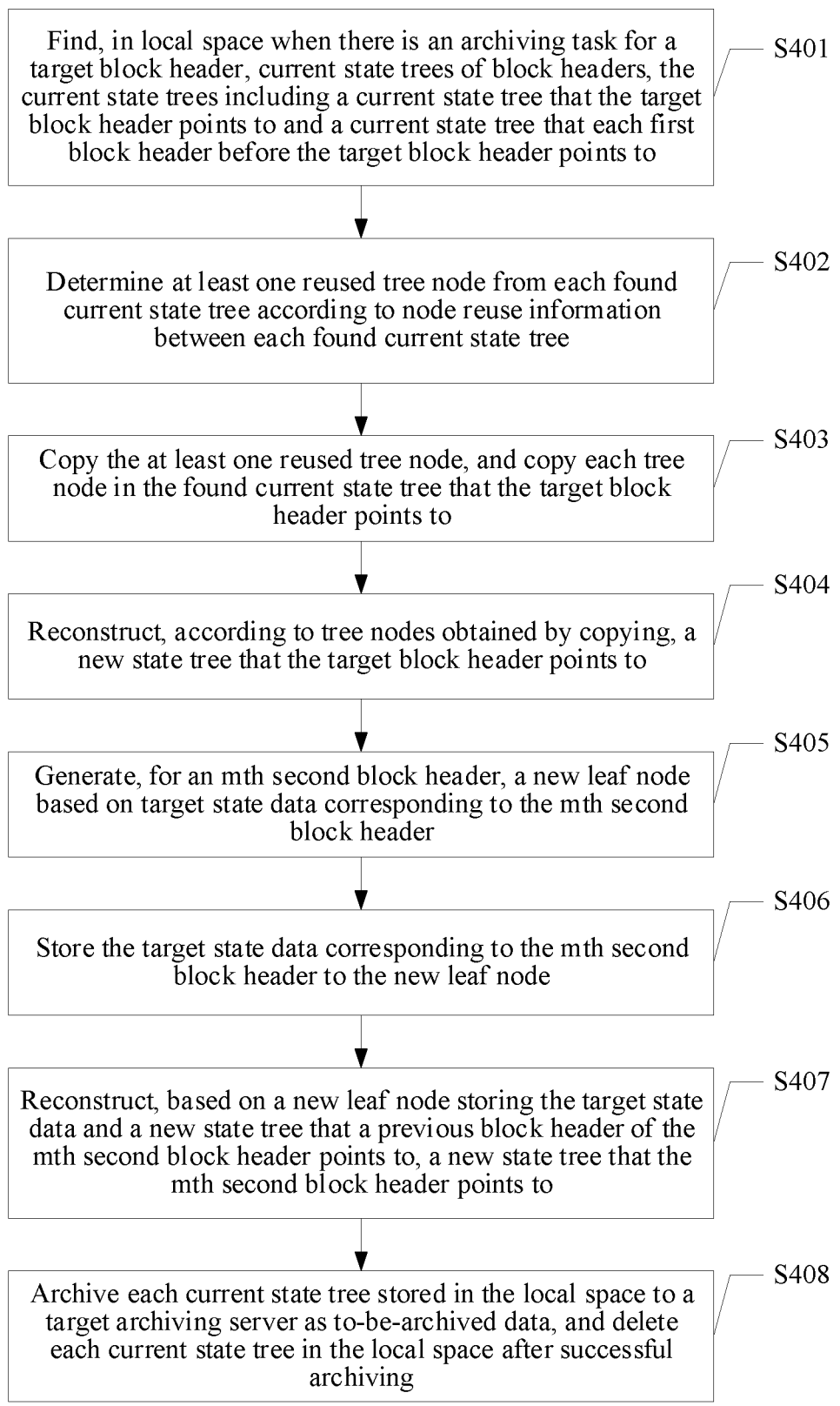
FIG. 4 is a schematic flowchart of a data archiving method according to an embodiment of the present disclosure.

An embodiment of the present disclosure provides a data archiving method. The data archiving method may be performed by the above-mentioned target device. Referring to FIG. 4, the data archiving method may include the following steps S401 to S408:

S401: Find, in local space when an archiving task for a target block header exists, current state trees of block headers, the current state trees a current state tree that the target block header points to and a current state tree that each first block header before the target block header points to.

S402: Determine at least one reused tree node from each found current state tree according to node reuse information between each found current state tree.

The reused tree node represents a tree node reused in the current state tree that the target block header points to and a current state tree that any first block header points to.

For example, in FIG. 1B, an extension node 51, a branch node 52, an extension node 53, a data node 54, an extension node 55, and a data node 56 in a current state tree that a block header 99 points to are tree nodes reused in a current state tree that a block header 100 points to, and these tree nodes are reused tree nodes.

S403: Copy the at least one reused tree node, and copy each tree node in the found current state tree that the target block header points to.

S404: Reconstruct, according to tree nodes obtained by copying, a new state tree that the target block header points to.

In step S403 and step S404, the at least one reused tree node is copied, each tree node in the found current state tree that the target block header points to is copied, and the new state tree that the target block header points to is reconstructed by using the tree nodes obtained by copying. The tree nodes obtained by copying may include each reused tree node obtained by copying, and each tree node, obtained by copying, in the current state tree that the target block header points to.

Figure 5A:
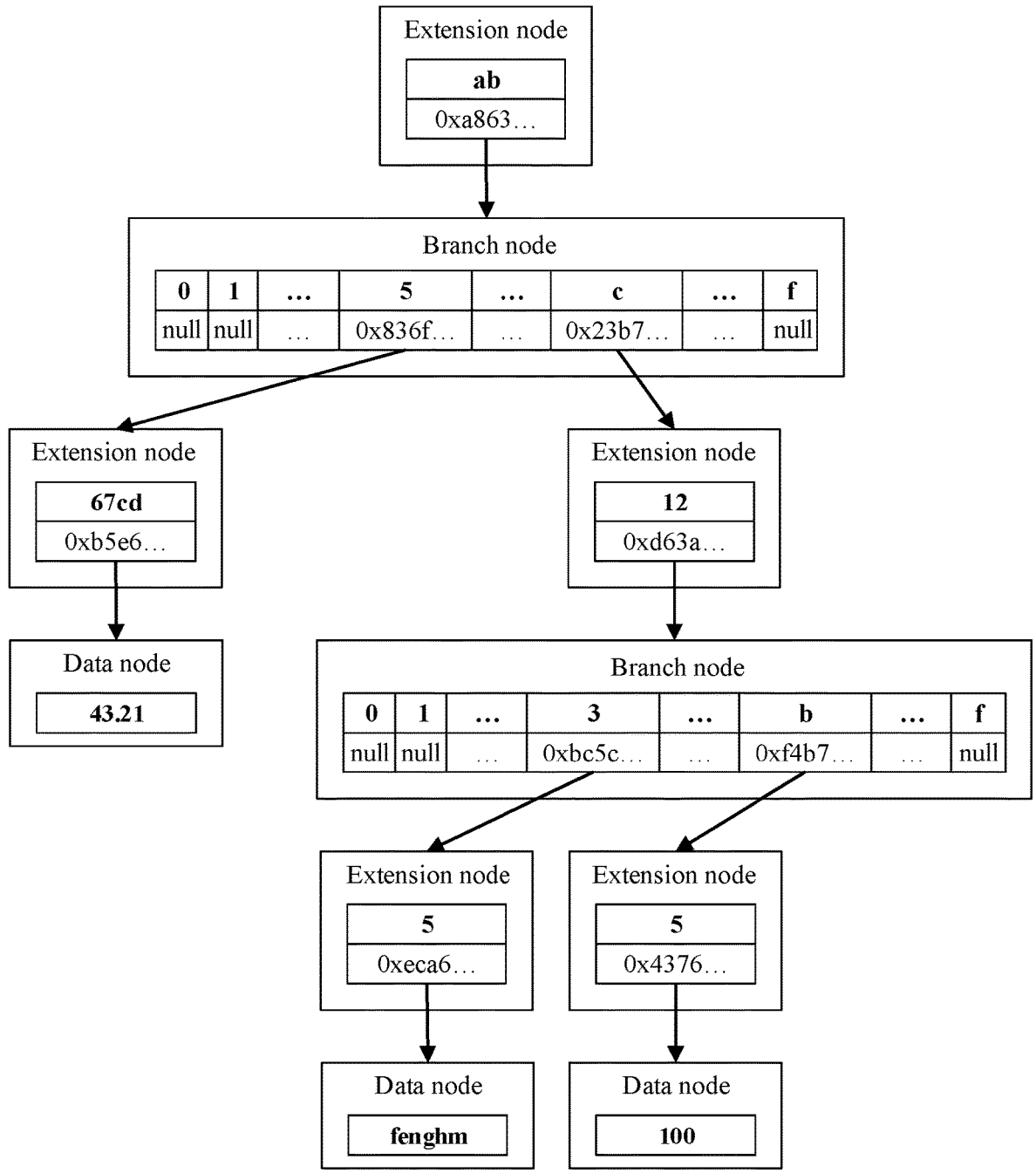
FIG. 5A is a schematic structural diagram of a new state tree that a target block header points to according to an embodiment of the present disclosure.

For example, in FIG. 1B, if the target block header is the block header 100, each tree node in the current state tree that the target block header points to may be an extension node 21, a branch node 22, an extension node 23, and a data node 24 in FIG. 1B, and tree nodes reused in the current state tree that the block header 100 points to are tree nodes in the current state tree that the block header 99 points to, that is, an extension node 15, a branch node 16, an extension node 17, a data node 18, an extension node 19, and a data node 20 in the above-described current state tree that the block header 99 points to. Then, the new state tree that the target block header points to may be reconstructed according to each foregoing tree node. The new state tree that the target block header points to may be shown in FIG. 5A.

S405: Generate, for an $m^{th}$ second block header, a new leaf node based on target state data corresponding to the $m^{th}$ second block header.

A quantity of second block headers is M, M being a positive integer, and $m \in [1, M]$. The target state data corresponding to the $m^{th}$ second block header represents state data, different from each piece of state data corresponding to a previous block header of the $m^{th}$ second block header, in a plurality of pieces of state data corresponding to the $m^{th}$ second block header.

For example, a manner in which the target state data corresponding to the $m^{th}$ second block header is obtained may be obtaining by a transaction or obtaining from a current state tree that the $m^{th}$ second block header points to.

In an implementation, an implementation process of obtaining target state data corresponding to a second block header through a transaction may include the following operations. The target device obtains transaction data corresponding to each second block header after the target block header. The transaction data corresponding to each second block header may be used for indicating a transaction operation on at least one piece of state data. For example, taking the $m^{th}$ second block header as an example, transaction data in the $m^{th}$ second block header indicates a transaction operation on the state data in the previous block header of the $m^{th}$ second block header. If m is 1, the transaction data in the $m^{th}$ second block header indicates a transaction operation on state data in the target block header. Then, a transaction operation indicated by the transaction data corresponding to each second block header is performed sequentially in order of block height from low to high according to all the state data stored in the new state tree that the target block header points to, to obtain target state data corresponding to each second block header. It may be understood that if m is 1, the target state data corresponding to the $m^{th}$ second block header is obtained by performing a transaction operation indicated by the transaction data corresponding to the $m^{th}$ second block header based on all the state data stored in the new state tree that the target block header points to. Target state data corresponding to an (m+1)th second block header is obtained by performing a transaction operation indicated by transaction data corresponding to the (m+1)th second block header based on all state data stored in a new state tree that the $m^{th}$ second block header points to. Construction of the new state tree that the $m^{th}$ second block header points to may refer to the following description.

In another specific implementation, a specific implementation process of obtaining target state data corresponding to a second block header according to a current state tree that the second block header points to may include that: the target device transverses each second block header after the target block header, determines a current second block header that is currently traversed, and after determining the second block header, copies target state data corresponding to the current second block header from a current state tree that the current second block header points to.

If the current second block header is the $m^{th}$ second block header, a specific implementation process of copying the target state data corresponding to the $m^{th}$ second block header may be as follows. It may be understood that tree nodes in a current state tree that the $m^{th}$ second block header points to store hash pointers for pointing to next-layer tree nodes. In this case, the target device may determine a plurality of node paths according to the hash pointers in the tree nodes in the current state tree, data stored in a last node (a data node) in each node path being the target state data. For example, if the tree nodes in the current state tree are divided into a root node (which may be a state snapshot), an intermediate node (the intermediate node may include an extension node and a branch node), and a leaf node (a data node), an implementation process of determining any one of the plurality of node paths in the current state tree may be as follows. The target device determines, according to a first hash pointer corresponding to the root node, a target intermediate node that the first hash pointer points to, and after determining the target intermediate node, determines, according to a second hash pointer corresponding to the target intermediate node, a target leaf node that the second hash pointer points to. A path formed by the root node, the target intermediate node, and the target leaf node is determined as a node path.

S406: Store the target state data corresponding to the $m^{th}$ second block header to the new leaf node.

S407: Reconstruct, according to a new leaf node storing the target state data and a new state tree that the previous block header of the $m^{th}$ second block header points to, the new state tree that the $m^{th}$ second block header points to.

In step S406 and step S407, after the target state data corresponding to the $m^{th}$ second block header is determined, the new state tree that the $m^{th}$ second block header points to may be reconstructed according to the target state data corresponding to the $m^{th}$ second block header and the new state tree that the previous block header of the $m^{th}$ second block header points to.

For example, an example in which m is 1 is used for description. The new state tree that the previous block header of the $m^{th}$ second block header points to is the new state tree that the target block header points to. The target device may store the target state data corresponding to the $m^{th}$ second block header to the new leaf node. The new leaf node is a data node in the new state tree that the $m^{th}$ second block header points to. The new state tree that the $m^{th}$ second block header points to is reconstructed according to the new leaf node storing the target state data and the new state tree that the previous block header of the $m^{th}$ second block header points to. The new state tree that each second block header points to may be reconstructed by the foregoing method. For the new state tree that the second block header points to, there may be node reuse between any new state tree and a new state tree that a next block header of a corresponding block header points to. For example, there is node reuse between the new state tree that the $m^{th}$ second block header points to and a new state tree that the (m+1)th second block header points to.

Figure 5B:
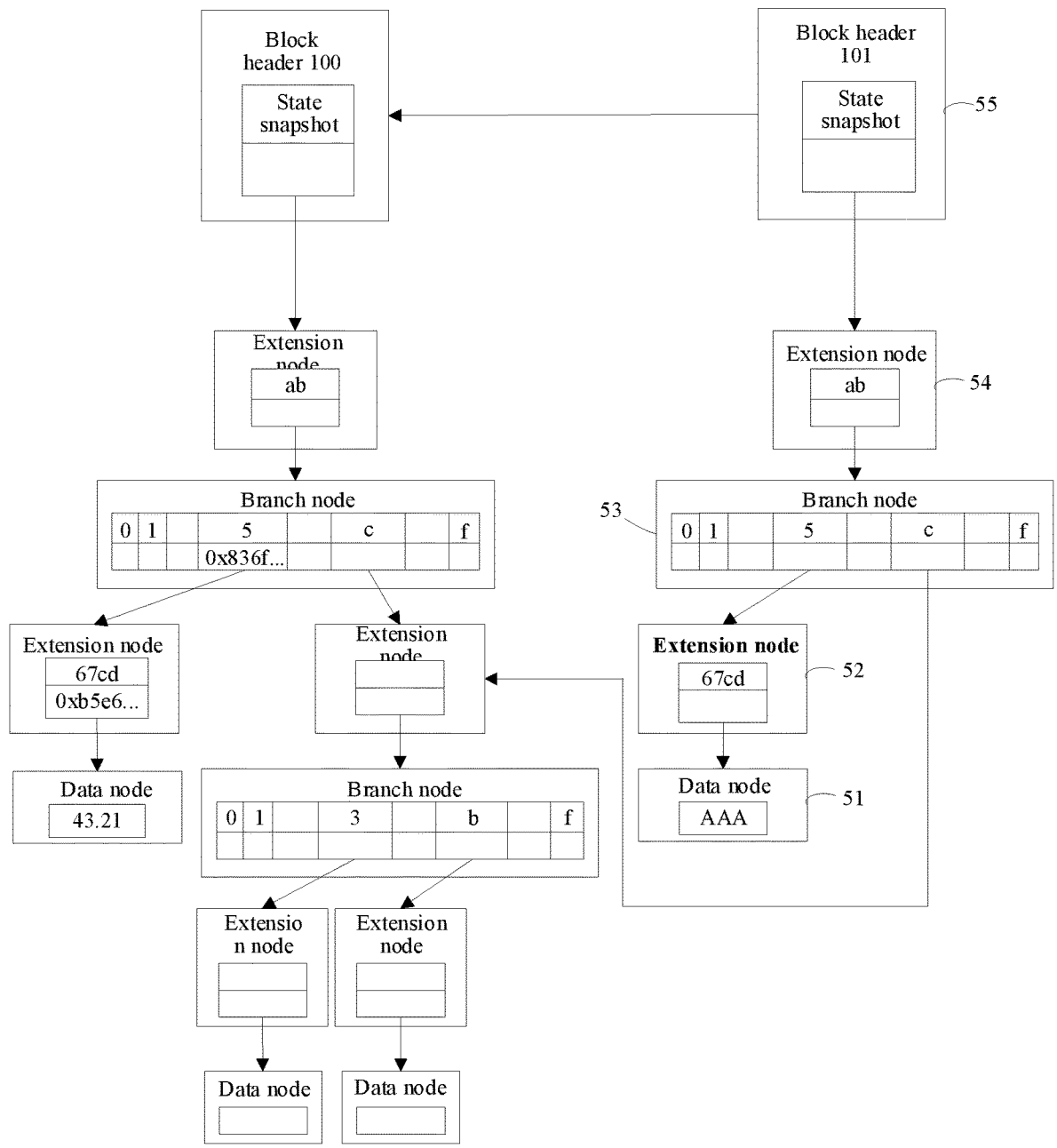
FIG. 5B is a schematic structural diagram of a new state tree that a second block header points to according to an embodiment of the present disclosure.

For example, if the target block header is the block header 100, the $m^{th}$ second block header is a block header 101, and AAA in the data node 51 shown in FIG. 5B is target state data corresponding to the block header 101. In this case, a hash value may be calculated according to the data node. The hash value may be used as a hash pointer in a parent node of the data node. The parent node of the data node is the extension node 52. Then, the extension node 52 may be filled with the hash value. Similarly, a hash value is calculated according to the filled extension node 52, and a position corresponding to a character "5" in the branch node 53 is filled with the hash value. By analogy, a state snapshot stored in the block header 101 may be calculated. A tree node in a branch in which corresponding non-updated historical state data in the block header 100 is may be reused in a state tree that the block header 101 points to.

S408: Archive each current state tree stored in the local space to a target archiving server as to-be-archived data, and delete each current state tree in the local space after successful archiving.

Specific implementations of steps S401 and S408 may refer to the specific descriptions about step S201 and S204 in the foregoing embodiment, and will not be elaborated herein.

In this embodiment of the present disclosure, the constructed new state tree that the target block header points to independently stores all the state data corresponding to the target block header, and there is no reused tree node in the new state tree that the target block header and the current state tree that the first block header before the target block header points to, that is, there is no node reuse between the new state tree that the target block header points to and the current state tree that the first block header before the target block header points to. In addition, since the new state tree that each second block header after the target block header points to is constructed based on the new state tree that the target block header points to, there may be node reuse between a new state tree that any second block header points to and a new state tree that a next block header of the any second block header but not between the new state tree that the any second block header points to and the current state tree that the first block header before the target block header points to. Therefore, after the new state tree is reconstructed, since there is no node reuse in the new state tree, each current state tree stored in the local space may be archived, and each current state tree in the local space may be deleted. In this way, storage space of a blockchain node is released, and pressure brought by a large amount of historical state data in the blockchain node to the storage space is reduced, thereby effectively ensuring running stability of the blockchain node.

Figure 6A:
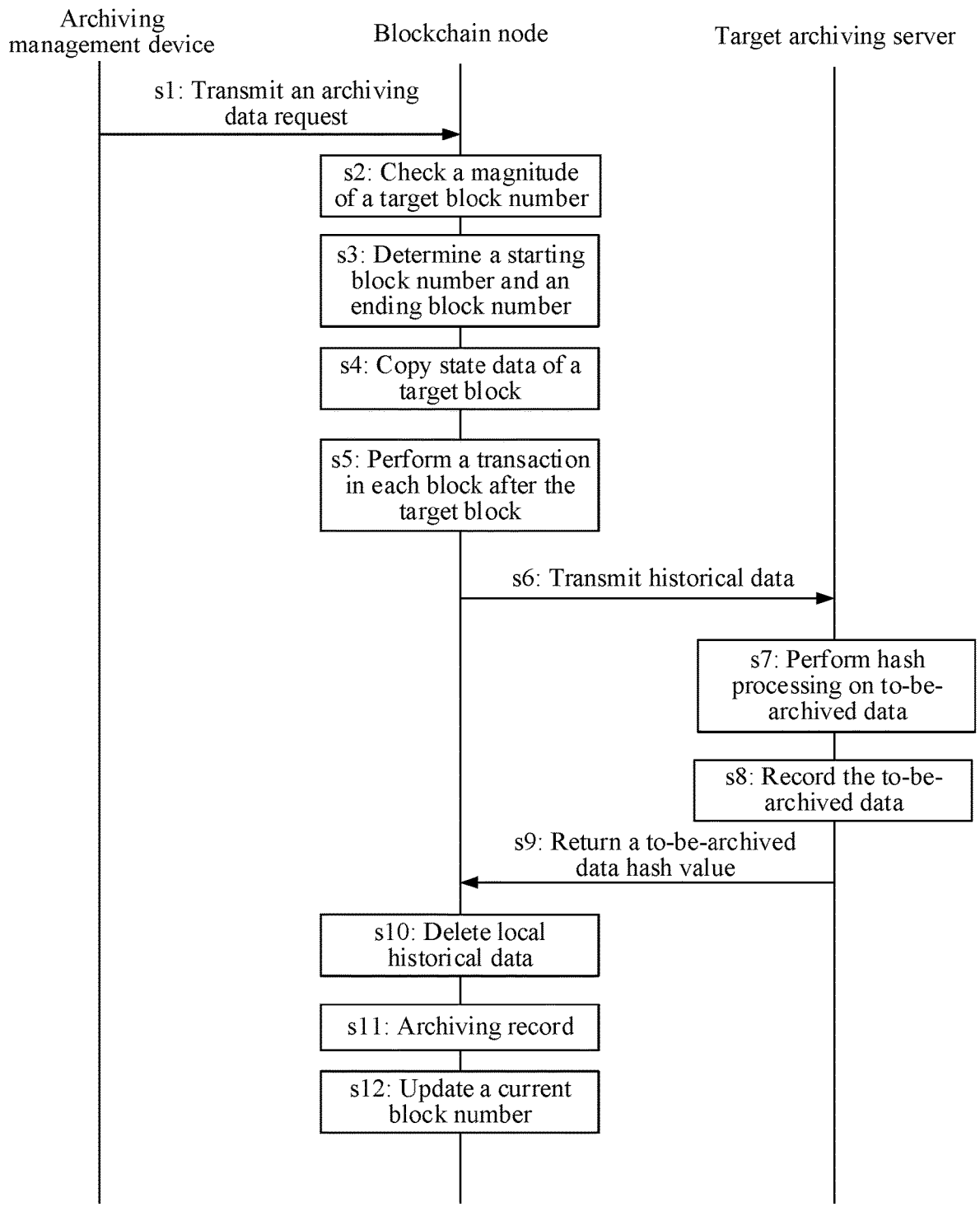
FIG. 6A is a schematic flowchart of a data archiving method according to an embodiment of the present disclosure.
Figure 6B:
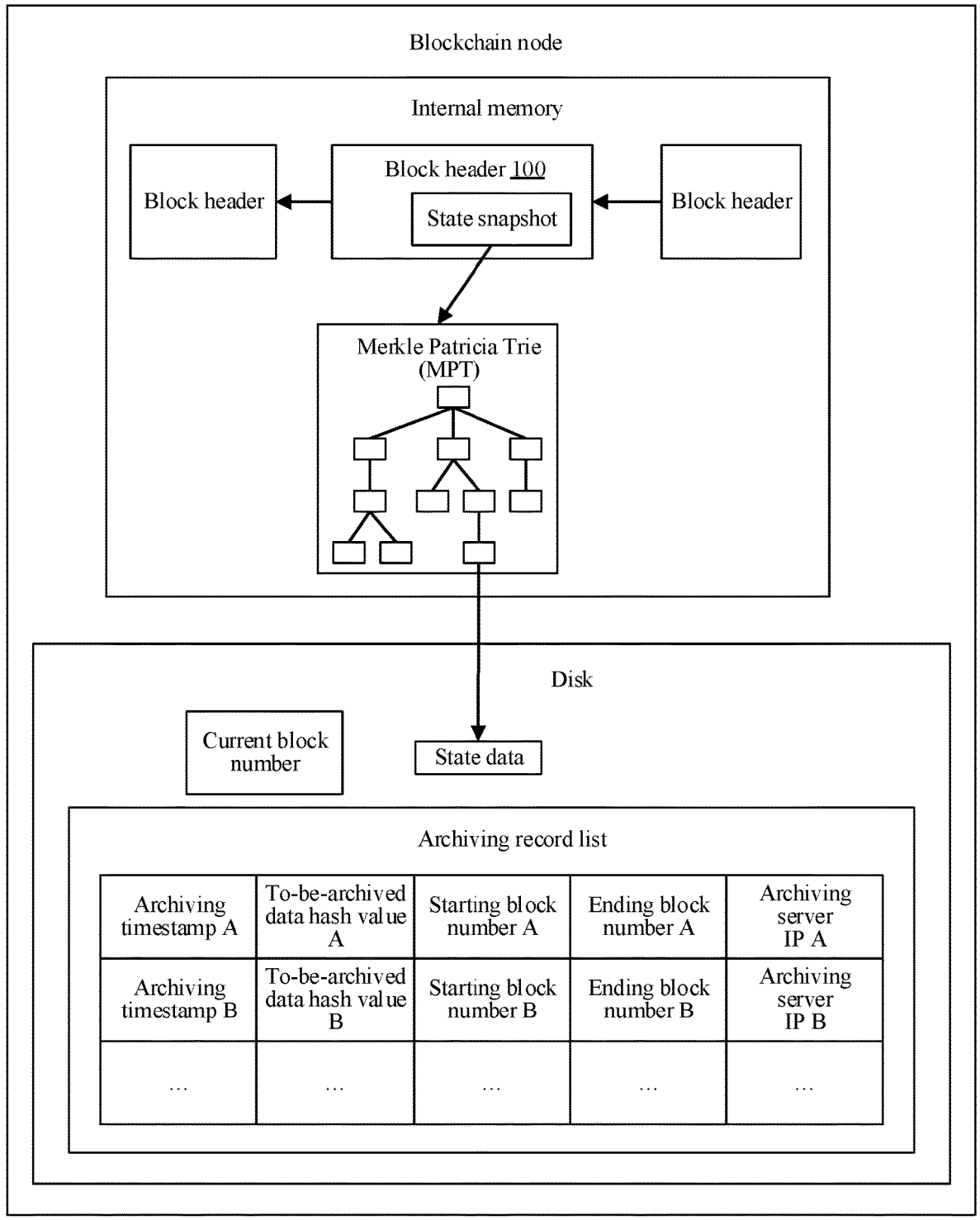
FIG. 6B is a schematic architectural diagram of a data archiving system according to an embodiment of the present disclosure.

In order to better understand the data archiving method provided in the embodiments of the present disclosure, the following makes further description in combination with FIG. 6A and FIG. 6B. The data archiving method shown in FIG. 6A involves an archiving management device, a target device (the target device is a blockchain node, and the blockchain is used as an example in the following description), and a target archiving server. In this embodiment of the present disclosure, an interaction process between the archiving management device, the target device, and the target archiving server is mainly described. As shown in FIG. 6A, a specific implementation process of data archiving includes the following steps s1 to s12:

s1: When the archiving management device has an archiving requirement for a target block header, the archiving management device transmits an archiving data request to the blockchain node, the archiving data request including a target block number, and the target block number being a block header number of the target block header in the above description.

s2: The blockchain node determines whether the target block number is greater than a current block number and less than or equal to a latest block number.

If a determination result is that the target block number is greater than the current block number and less than or equal to the latest block number, the following operations are continued. If a determination result is not the foregoing result, error information is returned, such that an archiving manager may adjust the archiving data request according to the error information. The current block number may be a block number of a current block header in the above description, or a block number of a first block header with a smallest block height in each first block header in the above description. The latest block number may be a block number of a latest block header in the above description.

s3: The blockchain node determines the current block number as a starting block number, and determines the target block number minus one as an ending block number.

The starting block number may be the block number of the first block header with the smallest block height in each first block header in the above description. The starting block number is the current block number (e.g., current generation block number). The ending block number may be a block number of a first block header with a largest block height in each first block header in the above description.

s4: The blockchain node obtains a set of state data corresponding to a target block by copying, in a disk, each tree node (that is, state data) in a state tree (MPT) that a state snapshot of the target block points to.

For example, FIG. 6B is a schematic architectural diagram of a data archiving system according to an embodiment of the present disclosure. In FIG. 6B, a block header 100 may be the target block header corresponding to the target block. The state tree that the state snapshot in the block header 100 points to may be the MPT in FIG. 6B. The target device may load, to an internal memory, the state tree that is stored in the disk and that the state snapshot of the target block points to, so as to obtain the set of the state data corresponding to the target block in the internal memory according to the state tree. In a data archiving process, data that is to be used in data archiving and that is in the disk may be loaded to the internal memory for related processing. For example, the blockchain node may search for a current state tree that the target block header points to and a current state tree that each first block header before the target block header points to. Therefore, a new state tree that the target block header points to may be reconstructed according to each found current state tree and a node reuse condition between each found current state tree. State data stored in the new state tree that the target block header points to is the set of the state data of the target block.

s5: The blockchain node performs a transaction in each block after the target block in a block number sequence based on the set of the state data of the target block, to obtain a set of state data in each block after the target block, the block number sequence being a sequence from small to large block heights.

For example, the blockchain node may obtain transaction data corresponding to each second block after the target block, one piece of transaction data indicating a transaction operation on at least one piece of state data. After the transaction data is obtained, a transaction operation indicated by the transaction data corresponding to each second block header may be performed sequentially in order of block height from low to high according to all the state data stored in the new state tree that the target block points to, to obtain target state data corresponding to each second block header. After obtaining the target state data corresponding to each second block header, the blockchain node may further reconstruct, based on the new state tree that the target block points to and the target state data corresponding to a second block header after the target block header, a new state tree that the second block header points to.

s6: The blockchain node transmits the starting block number, the ending block number, and historical data to the target archiving server.

The historical data is used as to-be-archived data. Each current state tree stored in local space may also be used as to-be-archived data.

s7: After receiving the to-be-archived data transmitted by the blockchain node, the target archiving server performs hash processing on the to-be-archived data to obtain a data hash value of the to-be-archived data.

s8: The target archiving server records a archiving timestamp, the data hash value, the starting block number and the ending block number of the to-be-archived data, and the to-be-archived data to an archived data list of the target archiving server.

s9: The target archiving server returns the data hash value to the blockchain node.

s10: After receiving the data hash value returned by the target archiving server, the blockchain node deletes local historical data.

The local historical data may be each current state tree in the local space.

s11: The blockchain node records the data hash value returned by the target archiving server, the archiving timestamp, the starting block number, the ending block number, and a server identifier of the target archiving server (for example, an IP address of the server) to an archiving record list in the local space.

The archiving record list may be an archiving record list shown in FIG. 6B.

s12: The blockchain node updates the current block number to the target block number.

According to the foregoing method, each current state tree in the local space may be deleted after the to-be-archived data is successfully archived to the corresponding archiving server. In this way, storage space of the blockchain node is released, and pressure brought by a large amount of historical state data in the blockchain node to the storage space is reduced, thereby effectively ensuring running stability of the blockchain node.

Figure 7:
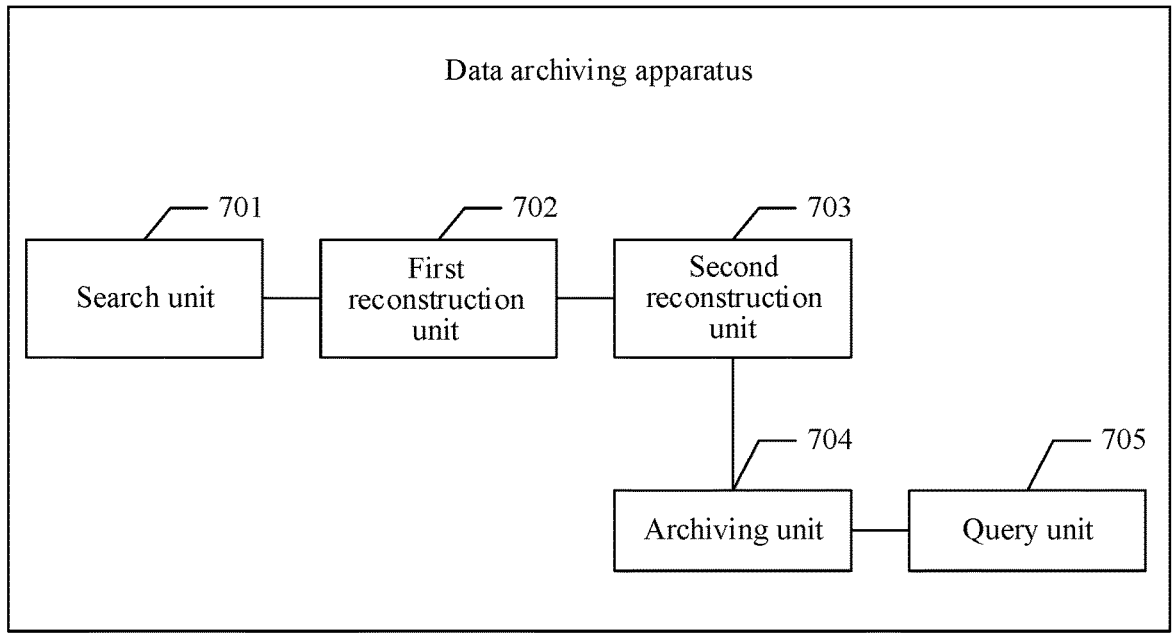
FIG. 7 is a schematic structural diagram of a data archiving apparatus according to an embodiment of the present disclosure.

Based on the description of the embodiment of the data archiving method, an embodiment of the present disclosure also discloses a data archiving apparatus. The data archiving apparatus may be a computer program (including program code) running in the above-mentioned target device. The data archiving apparatus may perform the method shown in FIG. 2 or FIG. 4. Referring to FIG. 7, the data archiving apparatus may run the following units:

a search unit 701, configured to search for, in local space when an archiving task for a target block header exists, a current state tree that the target block header points to and a current state tree that each first block header before the target block header points to, a current state tree that any block header points to representing a state tree that the any block header points to when the archiving task exists;

a first reconstruction unit 702, configured to reconstruct, according to the found current state trees and node reuse information between the current state trees, a new state tree that the target block header points to, the new state tree that the target block header points to independently storing state data corresponding to the target block header;

a second reconstruction unit 703, configured to reconstruct, according to the new state tree that the target block header points to and target state data corresponding to a second block header after the target block header, a new state tree that the second block header points to, where node reuse occurs between one of the new state trees corresponding to a block header and a new state tree that a block header next to the corresponding block header points to; and an archiving unit 704, configured to archive each current state tree stored in the local space to a target archiving server as to-be-archived data, and delete each current state tree in the local space after successful archiving.

In some embodiments, when reconstructing, according to each found current state tree and the node reuse information between the current state trees, the new state tree that the target block header points to, the first reconstruction unit 702 is further configured to: determine at least one reused tree node from each current state tree according to the node reuse information between the current state trees, the reused tree node representing a tree node reused in the current state tree that the target block header points to and a current state tree that any first block header points to; copy the at least one reused tree node, and copy each tree node in the current state tree that the target block header points to; and reconstruct, according to tree nodes obtained by copying, the new state tree that the target block header points to.

In some embodiments, a quantity of second block headers is M, M being a positive integer. When reconstructing, according to the new state tree that the target block header and the target state data corresponding to each second block header after the target block header, the new state tree that each second block header points to, the second reconstruction unit 703 is further configured to: perform the following processing for an $m^{th}$ second block header: generating a new leaf node based on target state data corresponding to the $m^{th}$ second block header, the target state data corresponding to the $m^{th}$ second block header representing state data, different from each piece of state data corresponding to a previous block header of the $m^{th}$ second block header, in a plurality of pieces of state data corresponding to the $m^{th}$ second block header, and $m \in [1, M]$; storing the target state data corresponding to the $m^{th}$ second block header to the new leaf node; and reconstructing, according to a new leaf node storing the target state data and a new state tree that the previous block header of the $m^{th}$ second block header points to, a new state tree that the $m^{th}$ second block header points to, at least one leaf node being reused in the new state tree that the $m^{th}$ second block header points to and the new state tree that the previous block header points to, and the previous block header being the target block header when m is 1.

In some embodiments, the second reconstruction unit 703 is further configured to: obtain transaction data corresponding to each second block header after the target block header, one piece of transaction data indicating a transaction operation on at least one piece of state data; and perform a transaction operation indicated by the transaction data corresponding to each second block header sequentially in order of block height from low to high according to all the state data stored in the new state tree that the target block header points to, to obtain the target state data corresponding to each second block header.

In some embodiments, the second reconstruction unit 703 is further configured to: traverse each second block header after the target block header, and determine a current second block header that is currently traversed; and copy target state data corresponding to the current second block header from a current state tree that the current second block header points to.

In some embodiments, when archiving each current state tree stored in the local space to the target archiving server as the to-be-archived data, the archiving unit 704 is further configured to: determine a block number of a first block header with a smallest block height in each first block header as a starting block number; determine a block number of a first block header with a largest block height in each first block header as an ending block number; determine each current state tree stored in the local space as the to-be-archived data, and generate an archiving request according to the to-be-archived data, the starting block number, and the ending block number; and transmit the archiving request to the target archiving server. The target archiving server performs a hash operation on the to-be-archived data according to the archiving request to obtain a data hash value, and returns the data hash value after storing the data hash value, the to-be-archived data, the starting block number, and the ending block number.

In some embodiments, the archiving unit 704 is further configured to: determine, in response to receiving the data hash value transmitted by the target archiving server, that the to-be-archived data is successfully archived; and record the data hash value, an archiving timestamp, the starting block number, the ending block number, and a server identifier of the target archiving server to an archiving record in the local space.

In some embodiments, the apparatus further includes a query unit 705. The query unit 705 is configured to: read the ending block number from the archiving record in the local space in response to a data query request for a specified block header; generate, when a block number of the specified block header is less than or equal to the ending block number, a specified data query request according to the data hash value in the archiving record in the local space and the block number of the specified block header; transmit the specified data query request to the target archiving server, the target archiving server determining and returning state data corresponding to the specified block header according to the data hash value carried in the specified data query request, and the data hash value indicating the current state tree in the to-be-archived data and the block number of the specified block header; and receive the state data that is returned by the target archiving server and that corresponds to the specified block header, and output the state data corresponding to the specified block header.

In some embodiments, the query unit 705 is configured to: determine, in the local space when the specified block number of the specified block header is greater than the ending block number, a new state tree that the specified block header points to, and determine a new state tree that each block header before the specified block header points to; and obtain state data corresponding to the specified block header according to each determined new state tree, and output the obtained state data.

In some embodiments, the target device communicates with a plurality of archiving servers. The archiving unit 704 is further configured to: obtain an archiving performance parameter of each archiving server, the archiving performance parameter including at least one of a remaining data storage capacity, a transmission bandwidth, and a security coefficient, and the security coefficient being used for measuring a probability that data of the archiving server is stolen; and determine an archiving priority of each archiving server according to the archiving performance parameter, and determine an archiving server corresponding to a highest archiving priority as the target archiving server.

In some embodiments, the archiving performance parameter includes the transmission bandwidth. When obtaining the archiving performance parameter of each archiving server, the archiving unit 704 is further configured to: transmit a bandwidth detection request to each archiving server, the bandwidth detection request being used for instructing the archiving server to return target data of a specified data volume; and receive the target data returned by each archiving server, and determine a transmission bandwidth of each archiving server based on time consumed by each archiving server to return the target data.

In some embodiments, the query unit 701 is further configured to: determine a current block header in a block header chain when there is the archiving task for the target block header, the current block header representing a block header that points to a state tree in the local space and that has a smallest block height; determine a latest block header in the block header chain, the latest block header representing a block header that points to a state tree in the local space and that has a largest block height; and perform, when a block height of the target block header is greater than that of the current block header and less than that of the latest block header, the operation of searching for, in a local space, a current state tree that the target block header points to and a current state tree that each first block header before the target block header points to. The first block header is the current block header and each block header between the current block header and the target block header. The second block header is the latest block header and each block header between the latest block header and the target block header.

According to this embodiment of the present disclosure, the steps involved in the method shown in FIG. 2 or FIG. 4 may be performed by each unit in the data archiving apparatus shown in FIG. 7. For example, step S201 shown in FIG. 2 is performed by the search unit 701 shown in FIG. 7, S202 is performed by the first reconstruction unit 702 shown in FIG. 7, S203 is performed by the second reconstruction unit 703 shown in FIG. 7, and S204 is performed by the archiving unit 704 shown in FIG. 7. For another example, step S401 shown in FIG. 4 is performed by the search unit 701 shown in FIG. 7, step S402 to step S404 are performed by the first reconstruction unit 702 shown in FIG. 7, step S405 to step S407 are performed by the second reconstruction unit 703 shown in FIG. 7, and step S408 is performed by the archiving unit 704 shown in FIG. 7.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. According to this embodiment of the present disclosure, each unit in the data archiving apparatus shown in FIG. 7 may exist respectively or be combined into one or more other units. Alternatively, a certain (or some) unit in the units may be further split into multiple smaller function units, thereby implementing the same operations without affecting the technical effects of this embodiment of the present disclosure. The units are divided based on logical functions. In actual applications, a function of one unit may be realized by multiple units, or functions of multiple units may be realized by one unit. In another embodiment of the present disclosure, the data archiving apparatus may further include other units. In actual applications, these functions may also be realized cooperatively by the other units, and may be realized cooperatively by multiple units.

According to this embodiment of the present disclosure, a computer program (including program code) capable of performing each step involved in the corresponding method shown in FIG. 2 or FIG. 4 may be run in a general-purpose computing device, for example, a computer, including a processing element and a storage element, for example, a central processing unit (CPU), a random access memory (RAM), or a read-only memory (ROM), to structure the image processing apparatus shown in FIG. 7 and implement the data archiving method in the embodiments of the present disclosure. The computer program may be recorded in, for example, a computer-readable recording medium and loaded, by using the computer-readable recording medium, and run in the target device.

In this embodiment of the present disclosure, the target device may search for, in the local space when there is the archiving requirement, the current state tree that the target block header points to and the current state tree that each first block header before the target block header points to. Further, the new state tree that the target block header points to may be reconstructed according to each found current state tree and the node reuse condition between each found current state tree, the new state tree that the target block header points to independently storing all the state data corresponding to the target block header. The new state tree that each second block header points to is reconstructed based on the new state tree that the target block header points to and the target state data corresponding to each second block header after the target block header, node reuse occurs between one of the new state trees corresponding to a block header and a new state tree that a block header next to the corresponding block header points to. After the new state tree that the target block header points to and the new state tree that each second block header points to are reconstructed, each current state tree stored in the local space is archived to the target archiving server as the to-be-archived data, and each current state tree in the local space is deleted after successful archiving. According to the foregoing implementation method, stale state data (that is, the current state tree) stored in a blockchain node may be archived to release storage space of the blockchain node and reduce storage pressure of the blockchain node. Therefore, running performance of the blockchain node is improved, and stability of the blockchain node during running is further ensured.

Figure 8:
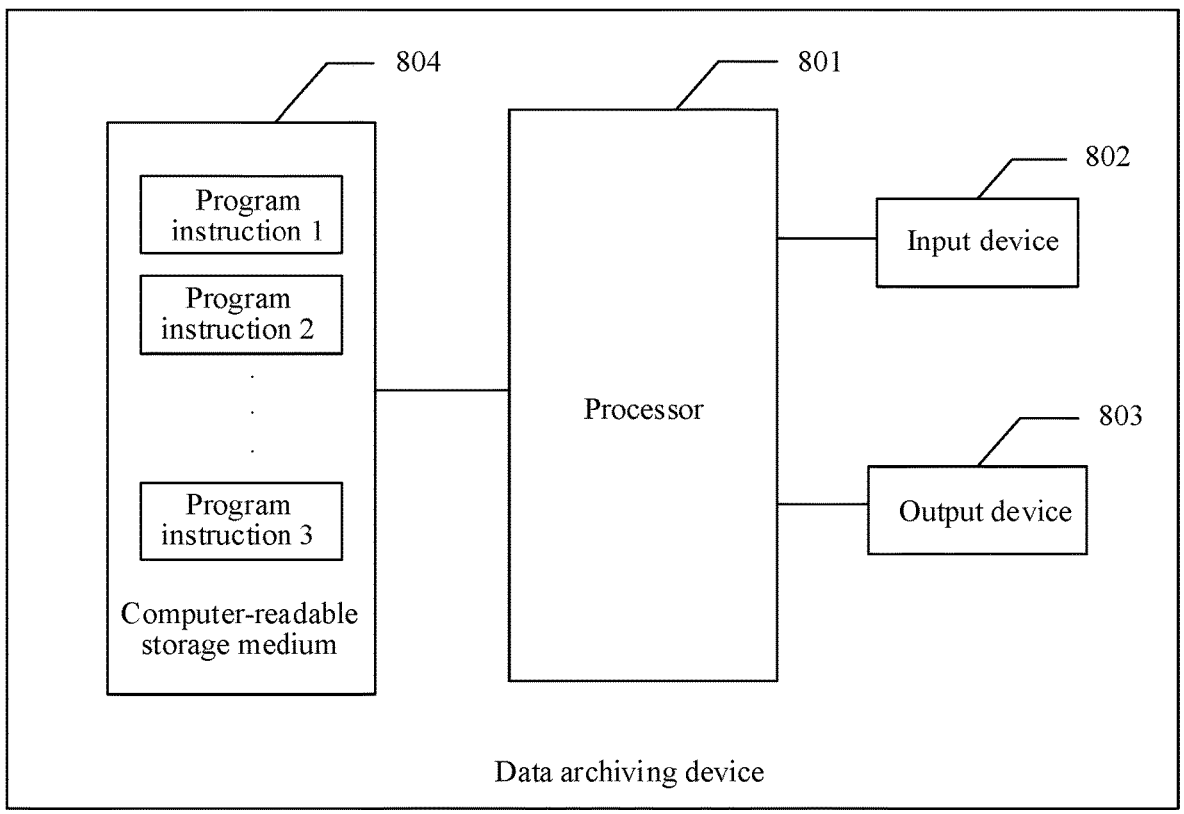
FIG. 8 is a schematic structural diagram of a data archiving device according to an embodiment of the present disclosure.

Based on the description of the embodiment of the data archiving method, an embodiment of the present disclosure also discloses a data archiving device (that is, a computer device for data archiving). The data archiving device may be the target device in the foregoing embodiment. Referring to FIG. 8, the data archiving device may include at least a processor 801, an input device 802, an output device 803, and a computer-readable storage medium 804. The processor 801, the input device 802, the output device 803, and the computer-readable storage medium 804 in the data archiving device may be connected by a bus or in other manners.

The computer-readable storage medium 804 is a memory device in the data archiving device for storing a program and data. It may be understood that the computer-readable storage medium 804 herein may include a built-in storage medium in the data archiving device, or may certainly include an extended storage medium supported by the data archiving device. The computer-readable storage medium 804 provides a storage space that stores an operating system of the data archiving device. Moreover, one or more instructions suitable for the processor 801 to load and execute are also stored in the storage space, and these instructions may be one or more computer programs (including program code). The computer-readable storage medium may be a high-speed RAM, or may be at least one computer-readable storage medium away from the processor. As a core and a control center of the data archiving device, the processor may be referred to as a CPU, and is suitable for implementing the one or more instructions, specifically loading and executing the one or more instructions, thereby implementing corresponding method processes or functions.

In an embodiment, the processor 801 may load and execute one or more first instructions stored in the computer-readable storage medium to implement corresponding steps of the method in the embodiment of the data archiving method. The processor 801 loads and executes the one or more first instructions stored in the computer-readable storage medium to implement the following operations:

searching for, in local space when an archiving task for a target block header exists, a current state tree that the target block header points to and a current state tree that each first block header before the target block header points to, a current state tree that any block header points to representing a state tree that the any block header points to when the archiving task exists; reconstructing, according to the found current state trees and node reuse information between the current state trees, a new state tree that the target block header points to, the new state tree that the target block header points to independently storing state data corresponding to the target block header; reconstructing, according to the new state tree that the target block header points to and target state data corresponding to a second block header after the target block header, a new state tree that the second block header points to, node reuse occurs between one of the new state trees corresponding to a block header and a new state tree that a block header next to the corresponding block header points to; and archiving the current state trees stored in the local space to a target archiving server, and deleting each current state tree in the local space after successful archiving.

In some embodiments, when reconstructing, according to each found current state tree and the node reuse information between the current state trees, the new state tree that the target block header points to, the processor 801 loads and executes the one or more instructions to: determine at least one reused tree node from each current state tree according to the node reuse information between the current state trees, the reused tree node representing a tree node reused in the current state tree that the target block header points to and a current state tree that any first block header points to; copy the at least one reused tree node, and copy each tree node in the current state tree that the target block header points to; and reconstruct, according to tree nodes obtained by copying, the new state tree that the target block header points to.

In some embodiments, a quantity of second block headers is M, M being a positive integer. When reconstructing, according to the new state tree that the target block header points to and the target state data corresponding to each second block header after the target block header, the new state tree that each second block header points to, the processor 801 loads and executes the one or more instructions to: perform the following processing for an $m^{th}$ second block header: generating a new leaf node based on target state data corresponding to the $m^{th}$ second block header, the target state data corresponding to the $m^{th}$ second block header representing state data, different from each piece of state data corresponding to a previous block header of the $m^{th}$ second block header, in a plurality of pieces of state data corresponding to the $m^{th}$ second block header, and $m \in [1, M]$; storing the target state data corresponding to the $m^{th}$ second block header to the new leaf node; and reconstructing, according to a new leaf node storing the target state data and a new state tree that the previous block header of the $m^{th}$ second block header points to, a new state tree that the $m^{th}$ second block header points to, at least one leaf node being reused in the new state tree that the $m^{th}$ second block header points to and the new state tree that the previous block header points to, and the previous block header being the target block header when m is 1.

In some embodiments, the processor 801 further loads and executes the one or more instructions to: obtain transaction data corresponding to each second block header after the target block header, one piece of transaction data indicating a transaction operation on at least one piece of state data; and perform a transaction operation indicated by the transaction data corresponding to each second block header sequentially in order of block height from low to high according to all the state data stored in the new state tree that the target block header points to, to obtain the target state data corresponding to each second block header.

In some embodiments, the processor 801 further loads and executes the one or more instructions to: traverse each second block header after the target block header, and determine a current second block header that is currently traversed; and copy target state data corresponding to the current second block header from a current state tree that the current second block header points to.

In some embodiments, when archiving each current state tree stored in the local space to the target archiving server as the to-be-archived data, the processor 801 further loads and executes the one or more instructions to: determine a block number of a first block header with a smallest block height in each first block header as a starting block number; determine a block number of a first block header with a largest block height in each first block header as an ending block number; determine each current state tree stored in the local space as the to-be-archived data, and generate an archiving request according to the to-be-archived data, the starting block number, and the ending block number; and transmit the archiving request to the target archiving server. The target archiving server performs a hash operation on the to-be-archived data according to the archiving request to obtain a data hash value, and returns the data hash value after storing the data hash value, the to-be-archived data, the starting block number, and the ending block number.

In some embodiments, the processor 801 further loads and executes the one or more instructions to: determine, in response to receiving the data hash value transmitted by the target archiving server, that the to-be-archived data is successfully archived; and record the data hash value, an archiving timestamp, the starting block number, the ending block number, and a server identifier of the target archiving server to an archiving record in the local space.

In some embodiments, the processor 801 further loads and executes the one or more instructions to: read the ending block number from the archiving record in the local space in response to a data query request for a specified block header; generate, when a block number of the specified block header is less than or equal to the ending block number, a specified data query request according to the data hash value in the archiving record in the local space and the block number of the specified block header; transmit the specified data query request to the target archiving server, the target archiving server determining and returning state data corresponding to the specified block header according to the data hash value carried in the specified data query request, and the data hash value indicating the current state tree in the to-be-archived data and the block number of the specified block header; and receive the state data that is returned by the target archiving server and that corresponds to the specified block header, and output the state data corresponding to the specified block header.

In some embodiments, the processor 801 further loads and executes the one or more instructions to: determine, in the local space when the specified block number of the specified block header is greater than the ending block number, a new state tree that the specified block header points to, and determine a new state tree that each block header before the specified block header points to; and obtain state data corresponding to the specified block header according to each determined new state tree, and output the obtained state data.

In some embodiments, the target device communicates with a plurality of archiving servers. The processor 801 further loads and executes the one or more instructions to: obtain an archiving performance parameter of each archiving server, the archiving performance parameter including at least one of a remaining data storage capacity, a transmission bandwidth, and a security coefficient, and the security coefficient being used for measuring a probability that data of the archiving server is stolen; and determine an archiving priority of each archiving server according to the archiving performance parameter, and determine an archiving server corresponding to a highest archiving priority as the target archiving server.

In some embodiments, the archiving performance parameter includes the transmission bandwidth. When obtaining the archiving performance parameter of each archiving server, the processor 801 further loads and executes the one or more instructions to: transmit a bandwidth detection request to each archiving server, the bandwidth detection request being used for instructing the archiving server to return target data of a specified data volume; and receive the target data returned by each archiving server, and determine a transmission bandwidth of each archiving server based on time consumed by each archiving server to return the target data.

In some embodiments, the processor 801 further loads and executes the one or more instructions to: determine a current block header in a block header chain when there is the archiving task for the target block header, the current block header being a block header that points to a state tree in the local space and that has a smallest block height; determine a current block header in a block header chain when there is the archiving task for the target block header, the current block header representing a block header that points to a state tree in the local space and that has a smallest block height; determine a latest block header in the block header chain, the latest block header representing a block header that points to a state tree in the local space and that has a largest block height; and perform, when a block height of the target block header is greater than that of the current block header and less than that of the latest block header, the operation of searching for, in a local space, a current state tree that the target block header points to and a current state tree that each first block header before the target block header points to. The first block header is the current block header and each block header between the current block header and the target block header. The second block header is the latest block header and each block header between the latest block header and the target block header.

In this embodiment of the present disclosure, the target device may search for, in the local space when there is the archiving requirement, the current state tree that the target block header points to and the current state tree that each first block header before the target block header points to. Further, the new state tree that the target block header points to may be reconstructed according to each found current state tree and the node reuse condition between each found current state tree, the new state tree that the target block header points to independently storing all the state data corresponding to the target block header. The new state tree that each second block header points to is reconstructed based on the new state tree that the target block header points to and the target state data corresponding to each second block header after the target block header, node reuse occurs between one of the new state trees corresponding to a block header and a new state tree that a block header next to the corresponding block header points to. After the new state tree that the target block header points to and the new state tree that each second block header points to are reconstructed, each current state tree stored in the local space is archived to the target archiving server as the to-be-archived data, and each current state tree in the local space is deleted after successful archiving. According to the foregoing implementation method, stale state data stored in a blockchain node may be archived to release storage space of a blockchain node and reduce storage pressure of the blockchain node. Therefore, running performance of the blockchain node is improved, and stability of the blockchain node during running is further ensured.

An embodiment of the present disclosure also provides a computer program product or computer program. The computer program product or computer program includes computer instructions. The computer instructions are stored in a computer-readable storage medium. A processor of a data archiving device reads the computer instructions from the computer-readable storage medium. The processor executes the computer instructions, such that the data archiving device performs the steps performed in the embodiment of the data archiving method shown in FIG. 2 or FIG. 4.

It may be understood by a person of ordinary skill in the art that all or some processes in the method of the foregoing embodiment may be completed by a computer program instructing related hardware. The program may be stored in a computer-readable storage medium. When the program is executed, the processes of each method embodiment may be included. The storage medium may be a magnetic disk, an optical disk, a ROM, a RAM, or the like.

The above is only the preferred embodiment of the present disclosure and certainly not intended to limit the scope of the present disclosure. It may be understood by a person of ordinary skill in the art that implementation of all or some processes in the foregoing embodiment and equivalent variations made according to the claims of the present disclosure also fall within the scope of the present disclosure.

What is claimed is:

1. A data archiving method, applied to a computer device and comprising:
  finding, in local space when an archiving task for a target block header exists, current state trees of block headers, the current state trees comprising a current state tree that the target block header points to and a current state tree that a first block header before the target block header points to;
  reconstructing new state trees, comprising:
    reconstructing, according to the found current state trees and node reuse information between the current state trees, a new state tree that the target block header points to; the new state tree that the target block header points to independently storing state data corresponding to the target block header; and
    reconstructing, according to the new state tree that the target block header points to and target state data corresponding to a second block header after the target block header, a new state tree that the second block header points to,
    wherein node reuse occurs between one of the new state trees corresponding to a block header and a new state tree that a block header next to the corresponding block header points to; and
  archiving the current state trees stored in the local space to a target archiving server, and deleting the current state trees in the local space after successful archiving.

2. The method according to claim 1, wherein the reconstructing, according to the found current state trees and node reuse information between the current state trees, a new state tree that the target block header points to comprises:
  determining at least one reused tree node from the current state trees according to the node reuse information between the current state trees, the reused tree node representing a tree node reused in the current state tree that the target block header points to and a current state tree that any first block header points to;
  copying the at least one reused tree node, and copying tree nodes in the current state tree that the target block header points to; and
  reconstructing, according to the tree nodes obtained by copying, the new state tree that the target block header points to.

3. The method according to claim 1, wherein
  a quantity of second block headers is M, M being a positive integer, and
  the reconstructing, according to the new state tree that the target block header and target state data corresponding to a second block header after the target block header, a new state tree that the second block header points to comprises: performing the following processing for an $m^{th}$ second block header:
    generating a new leaf node based on target state data corresponding to the $m^{th}$ second block header, the target state data corresponding to the $m^{th}$ second block header representing at least one piece of state data, different from each piece of state data corresponding to a previous block header of the $m^{th}$ second block header, in a plurality of pieces of state data corresponding to the $m^{th}$ second block header, and $m \in [1, M]$;
    storing the target state data corresponding to the $m^{th}$ second block header to the new leaf node; and
    reconstructing, according to the new leaf node storing the target state data and a new state tree that the previous block header of the $m^{th}$ second block header points to, wherein at least one leaf node is reused in the new state tree that the $m^{th}$ second block header points to and the new state tree that the previous block header points to, and the previous block header is the target block header when m is 1.

4. The method according to claim 1, wherein the method further comprises:
  obtaining transaction data corresponding to the second block header after the target block header, one piece of transaction data indicating a transaction operation on at least one piece of state data; and
  performing a transaction operation indicated by the transaction data corresponding to each second block header sequentially in order of block height from low to high, according to the state data stored in the new state tree that the target block header points to, to obtain the target state data corresponding to each second block header.

5. The method according to claim 1, wherein the method further comprises:
  traversing each second block header after the target block header, and determining a current second block header that is currently traversed; and
  copying target state data corresponding to the current second block header from a current state tree that the current second block header points to.

6. The method according to claim 1, wherein the archiving the current state trees stored in the local space to a target archiving server comprises:
  determining a block number of a first block header with a smallest block height in at least one first block header as a starting block number;
  determining a block number of a first block header with a largest block height in at least one first block header as an ending block number;
  determining the current state trees stored in the local space as the data to be archived, and generating an archiving request according to the data, the starting block number, and the ending block number; and
  transmitting the archiving request to the target archiving server, the target archiving server performing a hash operation on the data according to the archiving request to obtain a data hash value, and returning the data hash value after storing the data hash value, the data, the starting block number, and the ending block number.

7. The method according to claim 6, wherein the method further comprises:
  determining, in response to receiving the data hash value transmitted by the target archiving server, that the data is successfully archived; and
  recording the data hash value, an archiving timestamp, the starting block number, the ending block number, and a server identifier of the target archiving server to an archiving record in the local space.

8. The method according to claim 7, wherein the method further comprises:
reading the ending block number from the archiving record in the local space in response to a data query request for a specified block header;
generating, when a block number of the specified block header is less than or equal to the ending block number, a specified data query request according to the data hash value in the archiving record in the local space and the block number of the specified block header;
transmitting the specified data query request to the target archiving server, the target archiving server determining and returning state data corresponding to the specified block header according to the data hash value carried in the specified data query request, and the data hash value indicating the current state tree in the data archived and the block number of the specified block header; and
receiving the state data that is returned by the target archiving server and that corresponds to the specified block header, and outputting the state data corresponding to the specified block header.

9. The method according to claim 8, wherein the method further comprises:
determining, in the local space when the specified block number of the specified block header is greater than the ending block number, a new state tree that the specified block header points to, and determining a new state tree that a block header before the specified block header points to; and
obtaining state data corresponding to the specified block header according to the determined new state tree, and outputting the obtained state data.

10. The method according to claim 1, wherein
the computer device communicates with a plurality of archiving servers, and
the method further comprises:
obtaining archiving performance parameters of the plurality of archiving servers, an archiving performance parameter of an archiving server comprising at least one of a remaining data storage capacity, a transmission bandwidth, or a security coefficient, and the security coefficient being used for measuring a probability of data of the archiving server being stolen; and
determining archiving priorities of the plurality of archiving servers according to the archiving performance parameters, and determining an archiving server corresponding to a highest archiving priority as the target archiving server.

11. The method according to claim 10, wherein
the archiving performance parameter comprises the transmission bandwidth, and
the obtaining archiving performance parameters of the plurality of archiving servers comprises:
transmitting a bandwidth detection request to each archiving server, the bandwidth detection request being used for instructing the archiving server to return target data of a specified data volume; and
receiving the target data returned by each archiving server, and determining a transmission bandwidth of each archiving server based on time consumed by each archiving server to return the target data.

12. The method according to claim 1, wherein the method further comprises:
determining a current block header in a block header chain when the archiving task for the target block header occurs, the current block header representing a block header that points to a state tree in the local space and that has a smallest block height;
determining a latest block header in the block header chain, the latest block header representing a block header that points to a state tree in the local space and that has a largest block height; and
performing, when a block height of the target block header is greater than that of the current block header and less than that of the latest block header, the operation of finding, in the local space, the current state trees, the first block header being the current block header and each block header between the current block header and the target block header, and the second block header being the latest block header and each block header between the latest block header and the target block header.

13. A data archiving apparatus, comprising: a processor and a non-transitory storage medium, and the processor being configured to obtain one or more instructions stored in the storage medium to perform:
finding, in local space when an archiving task for a target block header exists, current state trees of block headers, the current state trees comprising a current state tree that the target block header points to and a current state tree that a first block header before the target block header points to;
reconstructing new state trees, comprising:
reconstructing, according to the found current state trees and node reuse information between the current state trees, a new state tree that the target block header points to, the new state tree that the target block header points to independently storing state data corresponding to the target block header;
reconstructing, according to the new state tree that the target block header points to and target state data corresponding to a second block header after the target block header, a new state tree that the second block header points to,
wherein node reuse occurs between one of the new state trees corresponding to a block header and a new state tree that a block header next to the corresponding block header points to; and
archiving the current state trees stored in the local space to a target archiving server, and deleting the current state trees in the local space after successful archiving.

14. The apparatus according to claim 13, wherein the reconstructing, according to the found current state trees and node reuse information between the current state trees, a new state tree that the target block header points to comprises:
determining at least one reused tree node from the current state trees according to the node reuse information between the current state trees, the reused tree node representing a tree node reused in the current state tree that the target block header points to and a current state tree that any first block header points to;
copying the at least one reused tree node, and copying tree nodes in the current state tree that the target block header points to; and
reconstructing, according to the tree nodes obtained by copying, the new state tree that the target block header points to.

15. The apparatus according to claim 13, wherein
a quantity of second block headers is M, M being a positive integer, and
the reconstructing, according to the new state tree that the target block header and target state data corresponding to a second block header after the target block header, a new state tree that the second block header points to comprises: performing the following processing for an $m^{th}$ second block header:
   generating a new leaf node based on target state data corresponding to the $m^{th}$ second block header, the target state data corresponding to the $m^{th}$ second block header representing at least one piece of state data, different from each piece of state data corresponding to a previous block header of the $m^{th}$ second block header, in a plurality of pieces of state data corresponding to the $m^{th}$ second block header, and $m \in [1, M]$;
   storing the target state data corresponding to the $m^{th}$ second block header to the new leaf node; and
   reconstructing, according to the new leaf node storing the target state data and a new state tree that the previous block header of the $m^{th}$ second block header points to, wherein at least one leaf node is reused in the new state tree that the $m^{th}$ second block header points to and the new state tree that the previous block header points to, and the previous block header is the target block header when m is 1.

16. The apparatus according to claim 13, wherein the processor is further configured to perform:
   obtaining transaction data corresponding to the second block header after the target block header, one piece of transaction data indicating a transaction operation on at least one piece of state data; and
   performing a transaction operation indicated by the transaction data corresponding to each second block header sequentially in order of block height from low to high, according to the state data stored in the new state tree that the target block header points to, to obtain the target state data corresponding to each second block header.

17. The apparatus according to claim 13, wherein the processor is further configured to perform:
   traversing each second block header after the target block header, and determining a current second block header that is currently traversed; and
   copying target state data corresponding to the current second block header from a current state tree that the current second block header points to.

18. The apparatus according to claim 13, wherein the archiving the current state trees stored in the local space to a target archiving server comprises:
   determining a block number of a first block header with a smallest block height in at least one first block header as a starting block number;
   determining a block number of a first block header with a largest block height in at least one first block header as an ending block number;
   determining the current state trees stored in the local space as the data to be archived, and generating an archiving request according to the data, the starting block number, and the ending block number; and
   transmitting the archiving request to the target archiving server, the target archiving server performing a hash operation on the data according to the archiving request to obtain a data hash value, and returning the data hash value after storing the data hash value, the data, the starting block number, and the ending block number.

19. The apparatus according to claim 18, wherein the processor is further configured to perform:
   determining, in response to receiving the data hash value transmitted by the target archiving server, that the data is successfully archived; and
   recording the data hash value, an archiving timestamp, the starting block number, the ending block number, and a server identifier of the target archiving server to an archiving record in the local space.

20. A non-transitory computer-readable storage medium storing one or more instructions, and the one or more instructions, when run by a processor, causing the processor to perform:
   finding, in local space when an archiving task for a target block header exists, current state trees of block headers, the current state trees comprising a current state tree that the target block header points to and a current state tree that a first block header before the target block header points to;
   reconstructing new state trees, comprising:
      reconstructing, according to the found current state trees and node reuse information between the current state trees, a new state tree that the target block header points to, the new state tree that the target block header points to independently storing state data corresponding to the target block header;
      reconstructing, according to the new state tree that the target block header points to and target state data corresponding to a second block header after the target block header, a new state tree that the second block header points to,
      wherein node reuse occurs between one of the new state trees corresponding to a block header and a new state tree that a block header next to the corresponding block header points to; and
   archiving the current state trees stored in the local space to a target archiving server, and deleting the current state trees in the local space after the archiving is successful.

* * * * *